US011804135B2

(12) United States Patent
Sekiguchi et al.

(10) Patent No.: US 11,804,135 B2
(45) Date of Patent: Oct. 31, 2023

(54) OBJECT RECOGNITION APPARATUS, OBJECT RECOGNITION METHOD, AND COMPUTER READABLE MEDIUM

(71) Applicant: Mitsubishi Electric Corporation, Tokyo (JP)

(72) Inventors: Ryota Sekiguchi, Tokyo (JP); Koji Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/763,970

(22) PCT Filed: Nov. 28, 2019

(86) PCT No.: PCT/JP2019/046498
§ 371 (c)(1),
(2) Date: Mar. 25, 2022

(87) PCT Pub. No.: WO2021/106130
PCT Pub. Date: Jun. 3, 2021

(65) Prior Publication Data
US 2022/0351623 A1 Nov. 3, 2022

(51) Int. Cl.
*G08G 1/16* (2006.01)
(52) U.S. Cl.
CPC .................... *G08G 1/168* (2013.01)
(58) Field of Classification Search
CPC .......... G08G 1/168; G08G 1/163; G08G 1/04; G08G 1/166; G08G 1/167; G08G 1/16
See application file for complete search history.

(56) References Cited

U.S. PATENT DOCUMENTS

| 8,581,776 | B2* | 11/2013 | Tsunekawa | G08G 1/166 342/104 |
| 9,002,630 | B2* | 4/2015 | Suzuki | B62D 15/025 701/439 |
| 9,141,870 | B2* | 9/2015 | Fukata | G08G 1/166 |
| 9,174,672 | B2* | 11/2015 | Zeng | G01S 13/931 |

(Continued)

FOREIGN PATENT DOCUMENTS

| JP | 10-221451 A | | 8/1998 |
| JP | 10221451 A | * | 8/1998 |

(Continued)

OTHER PUBLICATIONS

Communication dated Jul. 12, 2022 from the Japanese Patent Office in Application No. 2021-561060.
International Search Report of PCT/JP2019/046498 dated Dec. 24, 2019 [PCT/ISA/210].

*Primary Examiner* — Hoi C Lau
(74) *Attorney, Agent, or Firm* — Sughrue Mion, PLLC; Richard C. Turner

(57) ABSTRACT

An extraction unit (101) extracts as a stationary object-detection point, a detection point on a stationary object among a plurality of detection points around a vehicle (200), the plurality of detection points being detected by an outside-detection sensor (501) at a plurality of detection timings. A grouping unit (105) groups two or more stationary object-detection points deduced as detection points on a same stationary object, among a plurality of stationary object-detection points extracted by the extraction unit (101) at the plurality of detection timings.

12 Claims, 20 Drawing Sheets

(56) References Cited

U.S. PATENT DOCUMENTS

| | | | |
|---|---|---|---|
| 9,199,668 B2* | 12/2015 | Zeng | G01S 13/931 |
| 9,223,013 B2* | 12/2015 | Stein | G06V 20/58 |
| 9,349,059 B2* | 5/2016 | Hayakawa | G06V 20/64 |
| 9,589,193 B2* | 3/2017 | Fukata | H04N 7/18 |
| 2011/0285574 A1* | 11/2011 | Tsunekawa | G01S 7/40 |
| | | | 342/107 |
| 2013/0218448 A1* | 8/2013 | Suzuki | G01S 13/931 |
| | | | 701/300 |
| 2015/0071490 A1* | 3/2015 | Fukata | G08G 1/165 |
| | | | 382/103 |
| 2015/0125031 A1* | 5/2015 | Hayakawa | G06V 20/64 |
| | | | 382/103 |
| 2015/0324651 A1* | 11/2015 | Fukata | G06T 7/70 |
| | | | 348/148 |
| 2017/0285647 A1 | 10/2017 | Saito et al. | |
| 2017/0322299 A1 | 11/2017 | Tanaka et al. | |
| 2020/0010118 A1 | 1/2020 | Fukaya et al. | |
| 2020/0017099 A1 | 1/2020 | Yamaguchi et al. | |

FOREIGN PATENT DOCUMENTS

| | | | | |
|---|---|---|---|---|
| JP | 10-283592 A | 10/1998 | | |
| JP | 2001-109999 A | 4/2001 | | |
| JP | 2002-120677 A | 4/2002 | | |
| JP | 2004-239792 A | 8/2004 | | |
| JP | 2004239792 A | * | 8/2004 | |
| JP | 2008-207732 A | 9/2008 | | |
| JP | 2009-086788 A | 4/2009 | | |
| JP | 2012-003582 A | 1/2012 | | |
| JP | 2012-026888 A | 2/2012 | | |
| JP | 2012-175314 A | 9/2012 | | |
| JP | 2016-085037 A | 5/2016 | | |
| JP | 2017-178166 A | 10/2017 | | |
| JP | 2017-191472 A | 10/2017 | | |
| JP | 2018-055321 A | 4/2018 | | |
| JP | 2018-158712 A | 10/2018 | | |
| JP | 2019-061328 A | 4/2019 | | |
| WO | 2012/059955 A1 | 5/2012 | | |
| WO | WO-2012059955 A1 | * | 5/2012 | B62D 15/025 |
| WO | 2018/070021 A1 | 4/2018 | | |

* cited by examiner

WHEN NUMBER OF GROUPS CONNECTED TO GROUP j IS M
[CONDITION]
(i) $d_{ij} <$ thresh
(ii) $d_{ij} < d_{jk}$

[PROCESS]
WHEN ALL OF ABOVE CONDITIONS ARE MET
· DELETE CONNECTION BETWEEN GROUPS j AND k
· CONNECT GROUPS i AND j

OBJECT RECOGNITION APPARATUS, OBJECT RECOGNITION METHOD, AND COMPUTER READABLE MEDIUM

CROSS REFERENCE TO RELATED APPLICATIONS

This application is a National Stage of International Application No. PCT/JP2019/046498 filed on Nov. 28, 2019.

TECHNICAL FIELD

The present invention relates to a technique of recognizing an environment around a vehicle.

BACKGROUND ART

In Patent Literature 1, information on a position of an obstacle detected by an obstacle detection device while a driver moves a vehicle from an arbitrary point to a parking position, is stored in a non-volatile memory. Then, in Patent Literature 1, when the vehicle is parked at the same parking position the next time, parking support is performed using the information on the position of the obstacle stored in the non-volatile memory.

CITATION LIST

Patent Literature

Patent Literature 1: JP2008-207732A

SUMMARY OF INVENTION

Technical Problem

In a technique of Patent Literature 1, when sensors which are spatially sparse are used as the obstacle detection devices, an area which is not actually travelable is mistakenly recognized as an area which is travelable. That is, there is a problem that the technique of Patent Literature 1 cannot properly recognize an environment around the vehicle.

The present invention mainly aims to solve such a problem. More specifically, the present invention mainly aims to accurately recognize an environment around a vehicle even when sensors which are spatially sparse are used.

Solution to Problem

An object recognition apparatus according to the present invention includes:

an extraction unit to extract as a stationary object-detection point, a detection point on a stationary object among a plurality of detection points around a vehicle, the plurality of detection points being detected by a sensor at a plurality of detection timings; and a grouping unit to group two or more stationary object-detection points deduced as detection points on a same stationary object, among a plurality of stationary object-detection points extracted by the extraction unit at the plurality of detection timings.

Advantageous Effects of Invention

According to the present invention, it is possible to accurately recognize an environment around a vehicle even when sensors which are spatially sparse are used.

DESCRIPTION OF EMBODIMENTS

Figure 1:
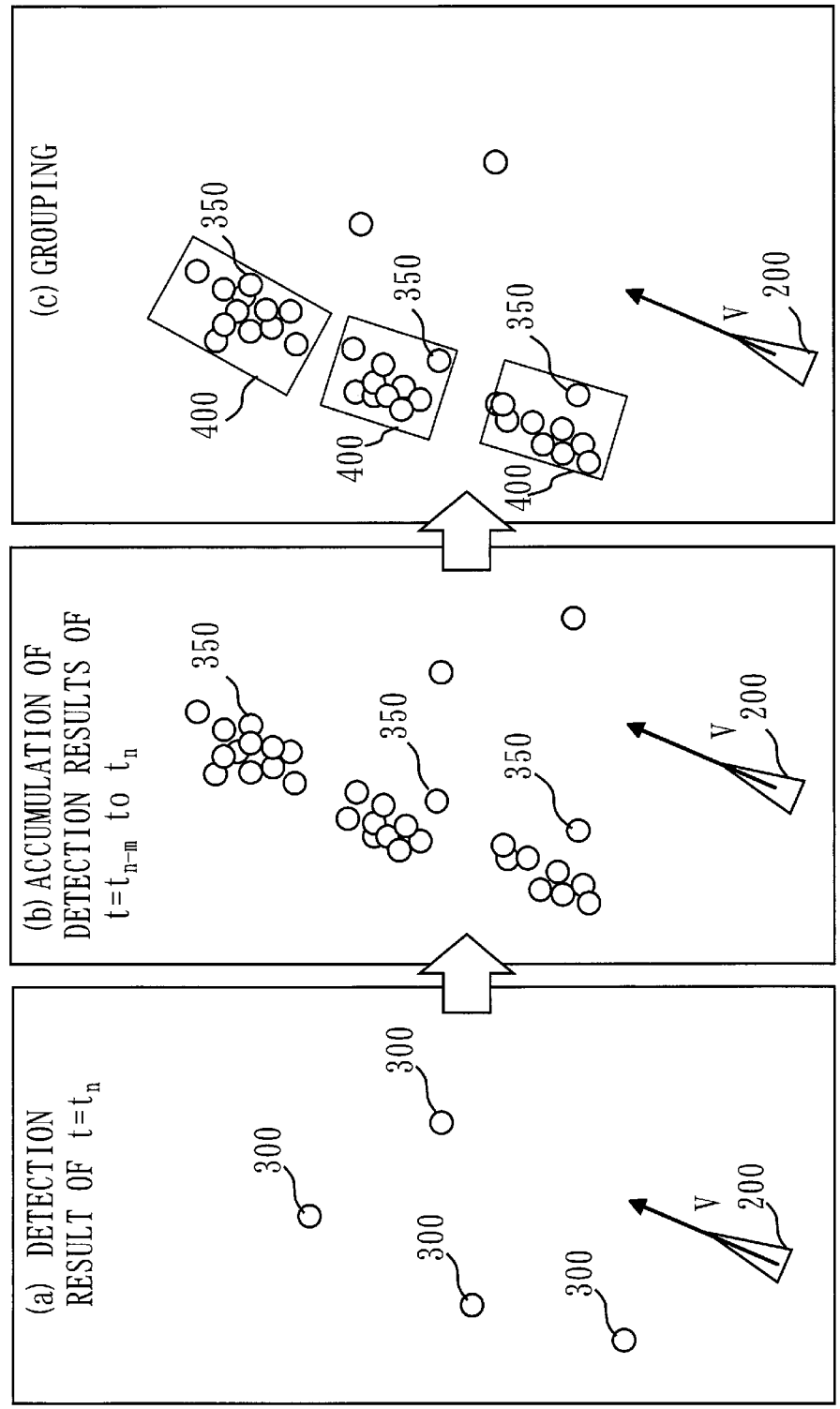
FIG. 1 is a diagram illustrating an outline of operation of an object recognition apparatus according to a first embodiment.

Hereinafter, embodiments of the present invention will be described using the drawings. In the following description of the embodiments and the drawings, parts assigned by the same reference numerals indicate the same parts or corresponding parts.

First Embodiment

Outline

First, with reference to FIG. 1, an outline of operation of an object recognition apparatus according to the present embodiment will be described.

Figure 11:
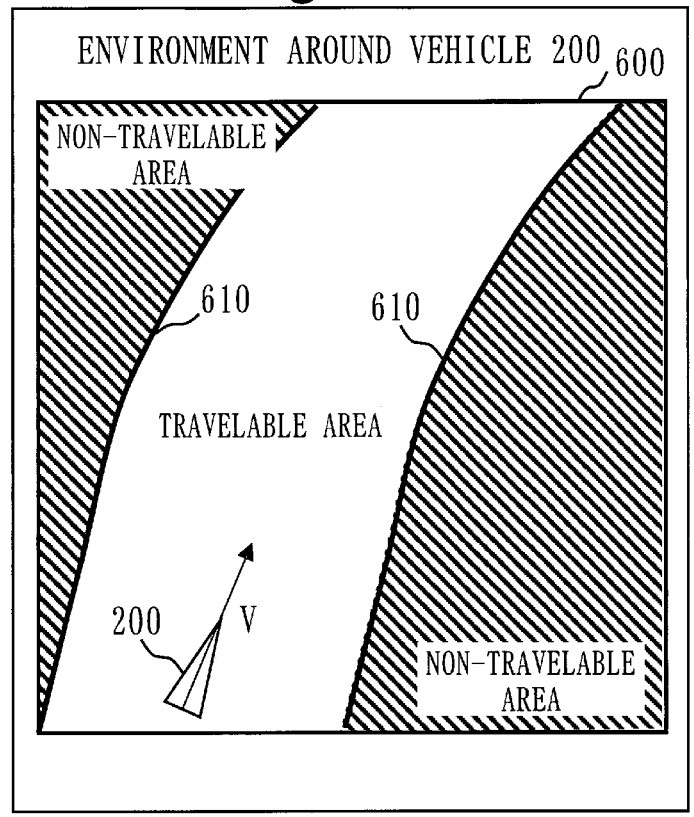
FIG. 11 is a diagram explaining an effect according to the first embodiment.

FIG. 1 is map data indicating a situation where a vehicle 200 travels on a road at speed V. In FIG. 1, a road is not depicted for a reason of simplification of the drawing. However, it is assumed that the vehicle 200 travels on a road 600 as illustrated in FIG. 11. In FIG. 11, the vehicle 200 travels on the road 600 both sides of which are walled off by guard rails 610. In FIG. 11, the road 600 is an area in which the vehicle 200 can travel, and a travelable area. The outside of the guard rails 610 are areas in which the vehicle 200 cannot travel, and a non-travelable area.

It is assumed that an object recognition apparatus and an outside-detection sensor which will be described later are mounted on the vehicle 200.

The outside-detection sensor searches for an object (including a stationary object and a moving object) around the vehicle 200 at each detection timing that repeatedly arrives. The detection timing arrives in a short cycle such as a millisecond or a microsecond. The outside-detection sensor is, for example, a millimeter wave radar, a camera, a sonar, or the like. The outside-detection sensor detects as a plurality of detection points 300, objects that exist around the vehicle 200.

Note that, in FIG. 1, illustration of the detection points 300 corresponding to the guard rail 610 on a right side illustrated in FIG. 11 is omitted.

(a) of FIG. 1 illustrates a detection result of $t=t_n$. That is, (a) of FIG. 1 illustrates an example in which the plurality of detection points 300 are placed on map data, the plurality of detection points 300 being detected by the outside-detection sensor at a time $t_n$ which is a detection timing. Since the outside-detection sensor is spatially sparse, the object that exists around the vehicle 200 is recognized as a point at the time $t_n$.

The object recognition apparatus according to the present embodiment extracts as stationary object-detection points (hereinafter, noted as stationary object-detection points 350), detection points on stationary objects among the plurality of detection points 300. Then, the object detection apparatus according to the present embodiment accumulates positions of the extracted stationary object-detection points 350.

(b) of FIG. 1 illustrates an accumulation state of detection results of "$t=t_{n-m}$ to $t_n$". That is, (b) of FIG. 1 illustrates an example in which the stationary object-detection points 350 are placed on the map data, the stationary object-detection points 350 being detected by the outside-detection sensor at a plurality of detection timings which are from the time $t_{n-m}$ to the time $t_n$.

The object recognition apparatus accumulates the stationary object-detection points 350 detected by the outside-detection sensor from the time $t_{n-m}$ to the $t_n$.

As described above, in the present embodiment, the stationary objects are recognized as points by mapping the plurality of stationary object-detection points 350 which are at the plurality of detection timings.

(c) of FIG. 1 illustrates an example of grouped stationary object-detection points 350.

The object recognition apparatus groups the stationary object-detection points 350 deduced as detection points on the same stationary objects among the accumulated stationary object-detection points 350. In (c) of FIG. 1, the stationary object-detection points 350 in a frame are treated as one group 400.

Grouping is performed, for example, by using spatial density. A group whose spatial density is equal to or smaller than a threshold value is determined as false detection. The group determined as the false detection is deleted from the map data.

In an example of (c) of FIG. 1, three groups 400 exist around the vehicle 200. Each of the groups 400 represents stationary objects positioned around the vehicle 200.

As described above, in the present embodiment, even when the sensor which is spatially sparse is used, it is possible to use a large number of detection points 300. For this reason, according to the present embodiment, it is possible to accurately recognize the positions of the stationary objects around the vehicle 200, and it is possible to accurately recognize an environment around the vehicle 200.

Description of Configuration

Figure 2:
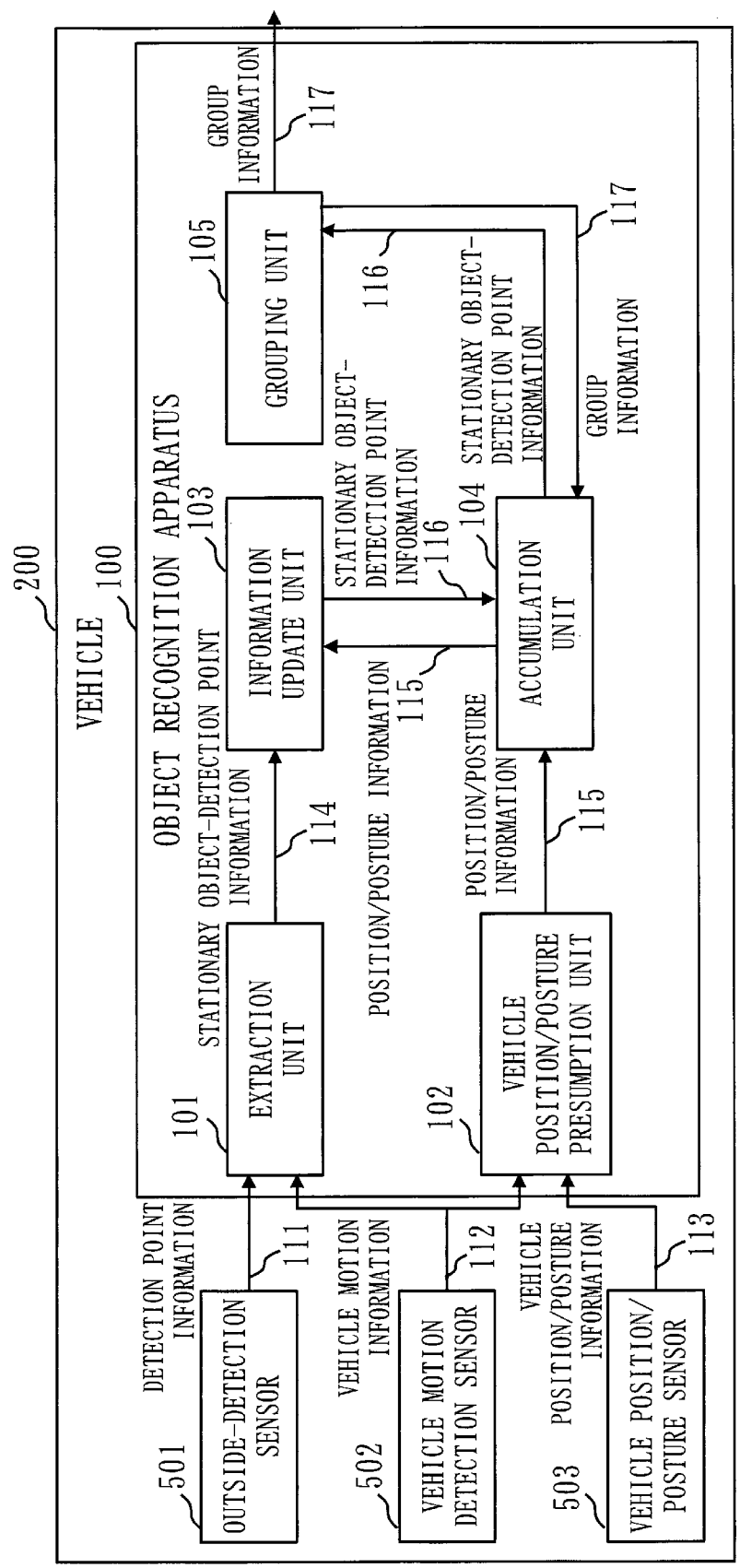
FIG. 2 is a diagram illustrating a functional configuration example of the object recognition apparatus according to the first embodiment.

FIG. 2 illustrates functional configuration of an object recognition apparatus 100 according to the present embodiment, and devices that are connected to the object recognition apparatus 100.

In the vehicle 200, the object recognition apparatus 100, an outside-detection sensor 501, a vehicle motion detection sensor 502, and a vehicle position/posture sensor 503 are mounted.

In FIG. 2, only elements directly related to the descriptions of the present embodiment are illustrated. For example, in the vehicle 200, various types of elements such as an engine, a brake, tires, and the like are included. However, since these are not directly related to the descriptions of the present embodiment, the illustration is omitted.

The object recognition apparatus 100 is a computer mounted on the vehicle 200. The object recognition apparatus 100 includes an extraction unit 101, a vehicle position/posture presumption unit 102, an information update unit 103, an accumulation unit 104, and a grouping unit 105. Details of the extraction unit 101, the vehicle position/posture presumption unit 102, the information update unit 103, the accumulation unit 104, and the grouping unit 105 will be described later.

Note that, an operation procedure of the object recognition apparatus 100 is equivalent to an object recognition method. Further, a program that realizes operation of the object recognition apparatus 100 is equivalent to an object recognition program.

The object recognition apparatus 100 is connected to the outside-detection sensor 501, the vehicle motion detection sensor 502, and the vehicle position/posture sensor 503.

The outside-detection sensor 501 detects an object outside the vehicle 200, that is, an object around the vehicle 200. As described above, the outside-detection sensor 501 is a millimeter wave radar, a camera, a sonar, or the like. The outside-detection sensor 501 detects as the plurality of detection points 300, the object that exists around the vehicle 200.

Further, the outside-detection sensor 501 outputs to the object recognition apparatus 100, detection point information 111 indicating positions and speed of the detection points 300.

The vehicle motion detection sensor 502 acquires speed and a yaw rate of the vehicle 200. Then, the vehicle motion detection sensor 502 outputs to the object recognition apparatus 100, vehicle motion information 112 indicating the acquired speed and yaw rate.

The vehicle position/posture sensor 503 acquires a position and posture (orientation) of the vehicle 200. Then, the vehicle position/posture sensor 503 outputs to the object recognition apparatus 100, vehicle position/posture information 113 indicating the acquired position and posture (orientation). The vehicle position/posture sensor 503 is, for example, GNSS (Global Navigation Satellite System) or a geomagnetic sensor.

Figure 23:
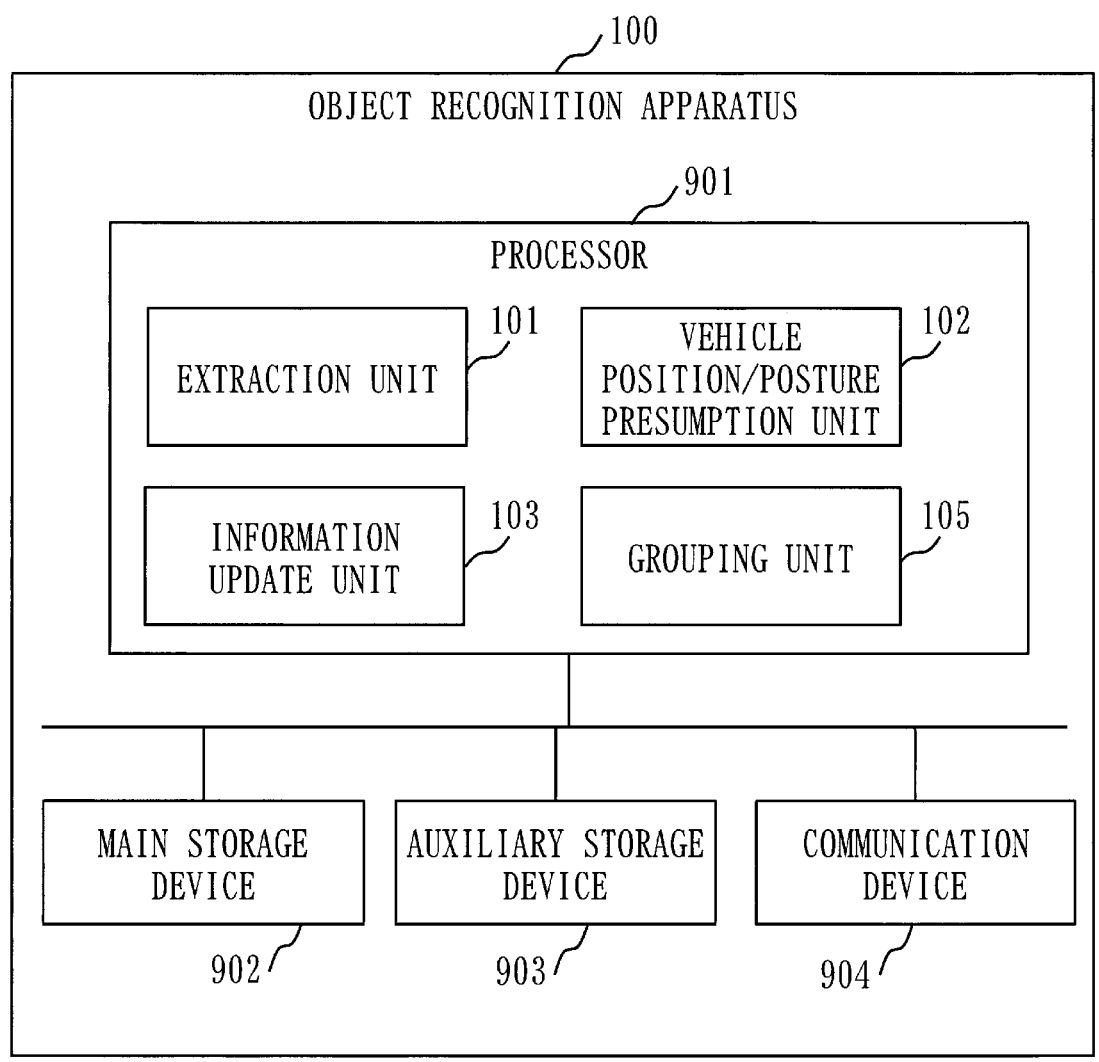
FIG. 23 is a diagram illustrating a hardware configuration example of the object recognition apparatus according to the first embodiment.

FIG. 23 illustrates a hardware configuration example of the object recognition apparatus 100 according to the present embodiment.

The object recognition apparatus 100 includes a processor 901, a main storage device 902, an auxiliary storage device 903, and a communication device 904 as pieces of hardware.

The auxiliary storage device 903 stores programs that realize functions of the extraction unit 101, the vehicle position/posture presumption unit 102, the information update unit 103, and the grouping unit 105 which are illustrated in FIG. 2.

These programs are loaded from the auxiliary storage device 903 into the main storage device 902. Then, the processor 901 executes these programs, and performs operation of the extraction unit 101, the vehicle position/posture presumption unit 102, the information update unit 103, and the grouping unit 105 which will be described later.

FIG. 23 schematically illustrates a state in which the processor 901 executes programs that realize the functions of the extraction unit 101, the vehicle position/posture presumption unit 102, the information update unit 103, and the grouping unit 105.

The accumulation unit 104 illustrated in FIG. 2 is realized by the main storage device 902 or the auxiliary storage device 903.

The communication device 904 receives the detection point information 111 from the outside-detection sensor 501. Further, the communication device 904 receives the vehicle motion information 112 from the vehicle motion detection sensor 502. Further, the communication device 904 receives the vehicle position/posture information 113 from the vehicle position/posture sensor 503.

Next, the extraction unit 101, the vehicle position/posture presumption unit 102, the information update unit 103, the accumulation unit 104, and the grouping unit 105 which are illustrated in FIG. 2 will be described.

The extraction unit 101 extracts as the stationary object-detection point 350, the detection point 300 on the stationary object among the plurality of detection points 300 which are the plurality of points around the vehicle 200 detected by the outside-detection sensor 501 at the plurality of detection timings. Note that, "around the vehicle 200" is within a scannable range of the outside-detection sensor 501.

That is, the extraction unit 101 acquires the detection point information 111 from the outside-detection sensor 501 via the communication device 904 at each detection timing. The extraction unit 101 acquires the detection point information 111 for each detection point 300. The detection point information 111 indicates position coordinates of the detection point 300, speed of the detection point 300, and detection time by the outside-detection sensor 501. The position coordinates of the detection point 300 indicated in the detection point information 111 are position coordinates in a coordinate system with the origin positioned at the position of the vehicle 200.

Further, the extraction unit 101 acquires the vehicle motion information 112 from the vehicle motion detection sensor 502 via the communication device 904.

For each detection timing, the extraction unit 101 extracts as the stationary object-detection point 350, the detection point 300 on the stationary object from among the plurality of detection points 300 indicated in the detection point information 111. More specifically, the extraction unit 101 obtains ground speed of each detection point 300 by using the vehicle motion information 112, and extracts the stationary object-detection point 350 based on the ground speed of each detection point 300.

Then, the extraction unit 101 generates stationary object-detection point information 114 indicating the position coordinates of the extracted stationary object-detection point 350 and the detection time. The extraction unit 101 generates the stationary object-detection point information 114 for each stationary object-detection point 350. The position coordinates of the stationary object-detection point 350 indicated in the stationary object-detection point information 114 are position coordinates in a coordinate system with the origin positioned at the position of the vehicle 200. Then, the extraction unit 101 outputs the generated stationary object-detection point information 114 to the information update unit 103.

A process performed by the extraction unit 101 is equivalent to an extraction process.

The vehicle position/posture presumption unit 102 acquires one of or both the vehicle motion information 112 and the vehicle position/posture information 113 via the communication device 904 at each presumption timing that repeatedly arrives. Then, the vehicle position/posture presumption unit 102 presumes, by using one of or both the vehicle motion information 112 and the vehicle position/posture information 113, a position and a posture of the vehicle 200 which are at a current time in a coordinate system (hereinafter, referred to as a map coordinate system) with the origin positioned at a certain point on the map and oriented to a certain direction.

Then, the vehicle position/posture presumption unit 102 stores in the accumulation unit 104, a presumption result as position/posture information 115. The position/posture information 115 indicates time (current time) at which the position and the posture are presumed, and the presumed position and posture of the vehicle 200.

Note that, the presumption timing does not need to match the detection timing.

The information update unit 103 acquires the stationary object-detection point information 114 from the extraction unit 101, and further acquires the position/posture information 115 from the accumulation unit 104. Then, the information update unit 103 converts the position of the stationary object-detection point 350 into the position in the map coordinate system by using the stationary object-detection point information 114 and the position/posture information 115. Then, the information update unit 103 stores in the accumulation unit 104, stationary object-detection point information 116 indicating a position of the stationary object-detection point 350 in the map coordinate system.

Further, the information update unit 103 instructs the accumulation unit 104 to delete the stationary object-detection point information 116 and the position/posture information 115 which meet a predetermined condition.

The accumulation unit 104 accumulates the position/posture information 115 acquired at the plurality of presumption timings.

Further, the accumulation unit 104 accumulates the stationary object-detection point information 116 acquired at the plurality of detection timings.

Further, the accumulation unit 104 deletes the stationary object-detection point information 116 and the position/posture information 115 which meet the predetermined condition, according to the instruction from the information update unit 103.

A process performed by the accumulation unit 104 is equivalent to an accumulation process.

The grouping unit 105 groups two or more stationary object-detection points 350 deduced as detection points on the same stationary object among a plurality of stationary object-detection points 350. For example, the grouping unit 105 groups the stationary object-detection points 350 by using the spatial density as described with reference to (c) of FIG. 1.

Further, after the grouping, the grouping unit 105 calculates for each group, the spatial density for two or more stationary object-detection points included in the group. Then, the grouping unit 105 discards a group whose spatial density calculated is equal to or smaller than a spatial density threshold value. The grouping unit 105 may change the spatial density threshold value according to a distance between the group and the vehicle 200.

The grouping unit 105 can display group information 117 indicating a result of the grouping, for example, on a display in the vehicle 200, which is not illustrated.

A process performed by the grouping unit 105 is equivalent to a grouping process.

Description of Operation

Next, an operation example of the object recognition apparatus 100 according to the present embodiment will be described.

Figure 3:
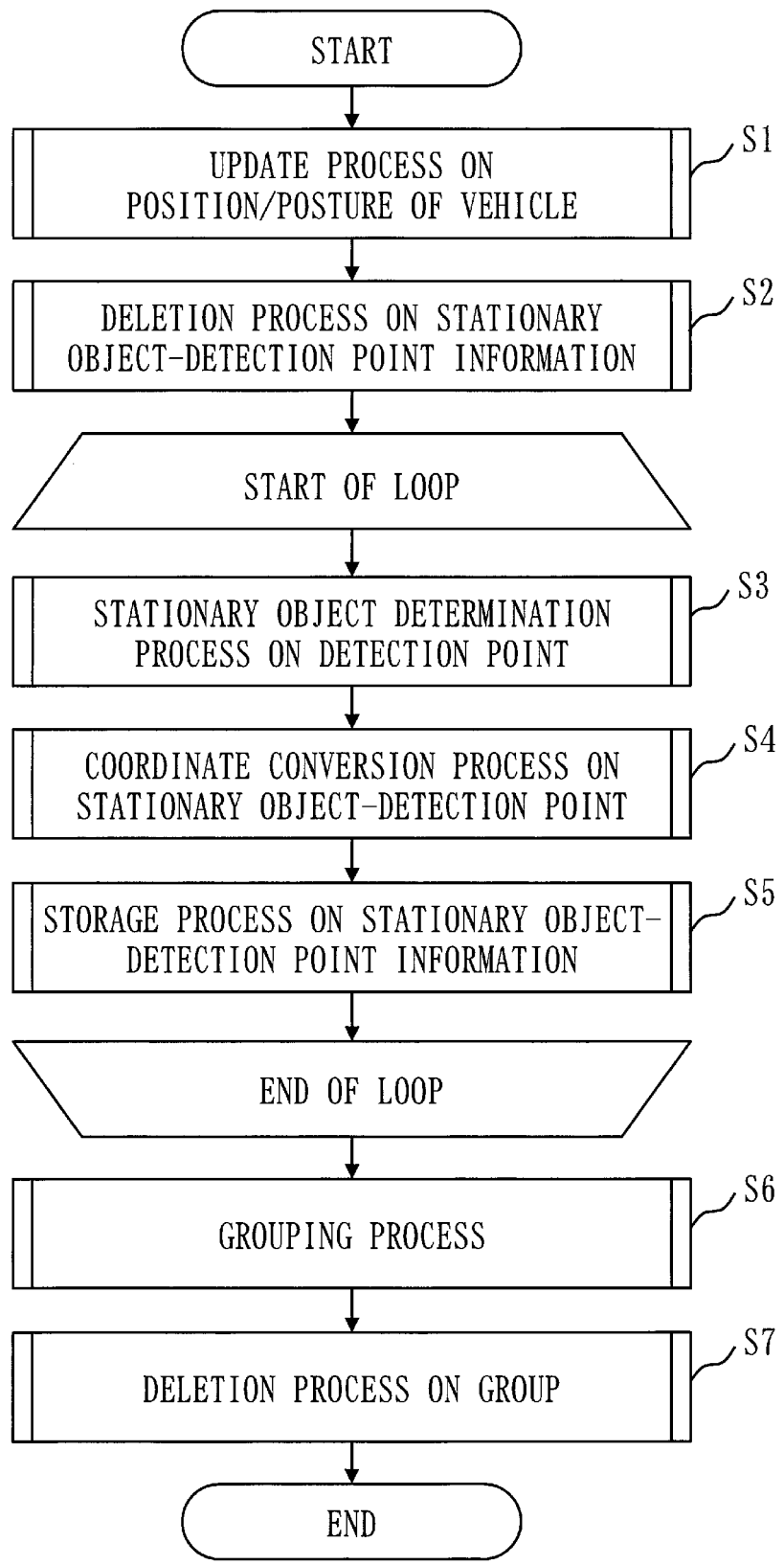
FIG. 3 is a flowchart illustrating an operation example of the object recognition apparatus according to the first embodiment.

FIG. 3 illustrates the operation example of the object recognition apparatus 100 according to the present embodiment.

[Step S1: An Update Process of a Position/Posture of a Vehicle 200]

In step S1, the vehicle position/posture presumption unit 102 updates the position/posture of the vehicle 200 in the map coordinate system.

Figure 4:
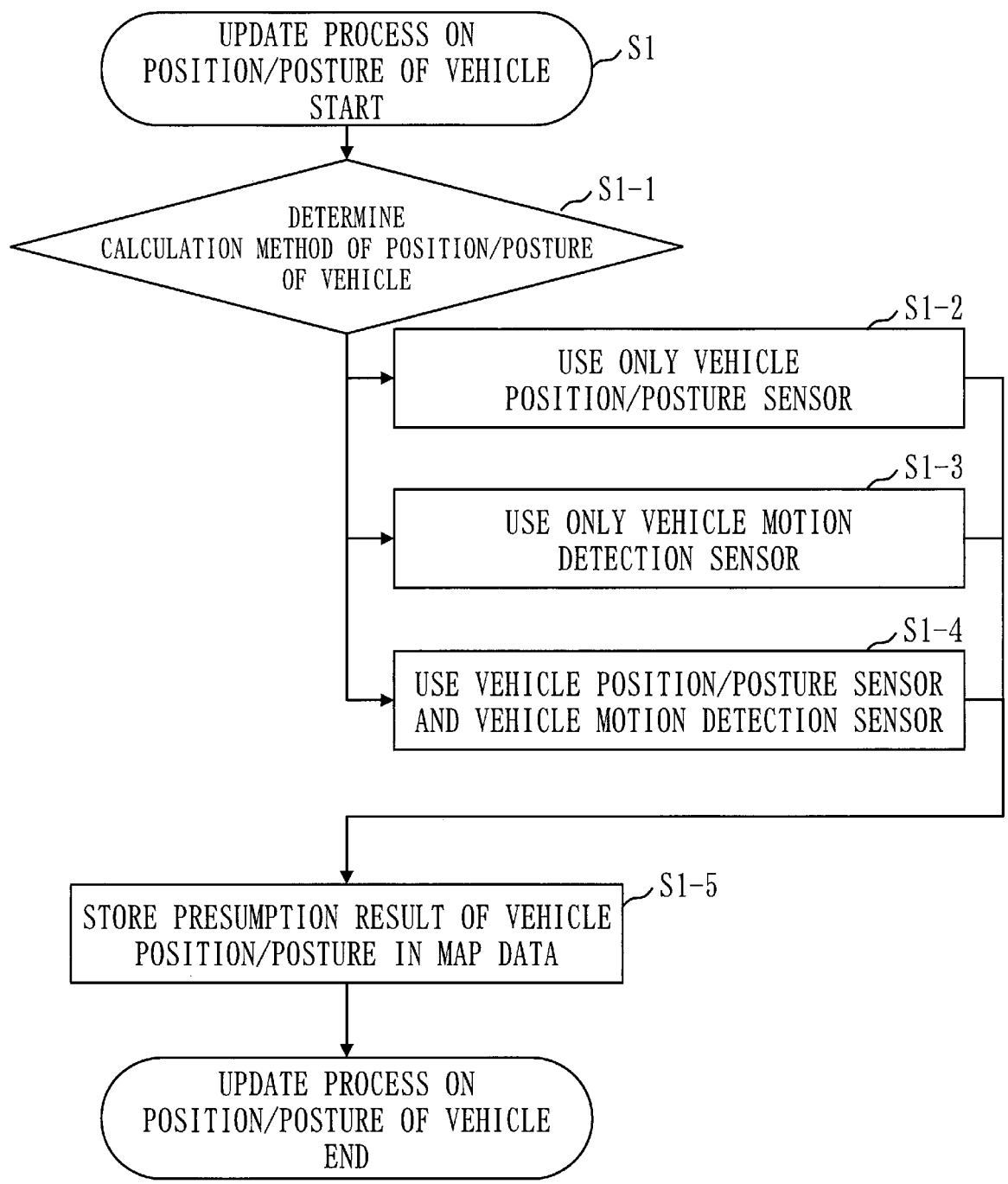
FIG. 4 is a flowchart illustrating details of an update process on a position/posture of a vehicle according to the first embodiment.

FIG. 4 illustrates details of step S1. Below, FIG. 4 will be described.

In step S1-1, the vehicle position/posture presumption unit 102 determines a calculation method of the position/posture of the vehicle 200. The vehicle position/posture presumption unit 102 determines the calculation method according to detection accuracy of the vehicle motion detection sensor 502 and the vehicle position/posture sensor 503. For example, when a notification of malfunction is received from the vehicle motion detection sensor 502 or the vehicle position/posture sensor 503, the vehicle position/posture presumption unit 102 decides not to use a sensor which has transmitted the notification of the malfunction. Further, when the detection accuracy of the vehicle motion detection sensor 502 or the vehicle position/posture sensor 503 is significantly deteriorated due to influence of an environment where the vehicle 200 travels, the vehicle position/posture presumption unit 102 decides not to use a sensor whose detection accuracy is significantly deteriorated.

That is, when the detection accuracy of the vehicle motion detection sensor 502 and the vehicle position/posture sensor 503 is satisfactory, the process proceeds to step S1-4.

On the other hand, when the detection accuracy of the vehicle position/posture sensor 503 is deteriorated, for example, when the vehicle 200 travels in a tunnel, the process proceeds to step S1-3.

Further, when the detection accuracy of the vehicle motion detection sensor 502 is deteriorated, the process proceeds to step S1-2.

In step S1-2, the vehicle position/posture presumption unit 102 presumes the position/posture of the vehicle 200 by using only the vehicle position/posture information 113 from the vehicle position/posture sensor 503.

First, the vehicle position/posture presumption unit 102 calculates a difference between: latitude and longitude of the origin in the map coordinate system; and latest latitude and longitude which are indicated in the vehicle position/posture information 113 from the vehicle position/posture sensor 503. Next, the vehicle position/posture presumption unit 102 converts the latest latitude and longitude which are indicated in the vehicle position/posture information 113, into values in a plane rectangular coordinate system by using the values of the calculated difference. Then, the vehicle position/posture presumption unit 102 acquires the orientation of the vehicle 200 by a geomagnetic sensor, and ends the process of step S1-2.

In step S1-3, the vehicle position/posture presumption unit 102 presumes the position/posture of the vehicle 200 by using only the vehicle motion information 112 from the vehicle motion detection sensor 502.

First, the vehicle position/posture presumption unit 102 calculates a time difference $\Delta t$ between the last update time $t_{n-1}$ and this update time $t_n$. Next, the vehicle position/posture presumption unit 102 assumes that the vehicle 200 performs uniform circular motion at speed V and a yaw rate $\omega$ from the time $t_{n-1}$ to the time $t_n$, and calculates change amounts ($\Delta x$, $\Delta y$, and $\Delta yaw$) of the position and the orientation of the vehicle 200 in the time difference $\Delta t$. Then, the vehicle position/posture presumption unit 102 adds the above-described change amounts ($\Delta x$, $\Delta y$, and $\Delta yaw$) to values of the position and the orientation (x, y, and yaw) of the vehicle 200 which are at the time $t_{n-1}$. Thereafter, the vehicle position/posture presumption unit 102 ends the process of step S1-3.

In step S1-4, the vehicle position/posture presumption unit 102 presumes the position/posture of the vehicle 200 by using the vehicle motion information 112 from the vehicle motion detection sensor 502 and the vehicle position/posture information 113 from the vehicle position/posture sensor 503.

Here, the vehicle position/posture presumption unit 102 establishes a model formula by using values of the vehicle motion information 112 and values of the vehicle position/posture information 113. Then, the vehicle position/posture presumption unit 102 updates the values of the position and the posture of the vehicle 200 by using extended Kalman filter which is known art, or the like. Thereafter, the vehicle position/posture presumption unit 102 ends the process of step S1-4.

Finally, in step S1-5, the vehicle position/posture presumption unit 102 stores in the accumulation unit 104, the position/posture information 115 indicating the position/posture of the vehicle 200 presumed by one of step S1-2, step S1-3, and step S1-4. Thereafter, the vehicle position/posture presumption unit 102 ends the process of step S1.

[Step S2: A Deletion Process of Stationary Object-Detection Point Information]

In step S2, the information update unit 103 deletes past stationary object-detection point information 116 stored in the accumulation unit 104.

Figure 5:
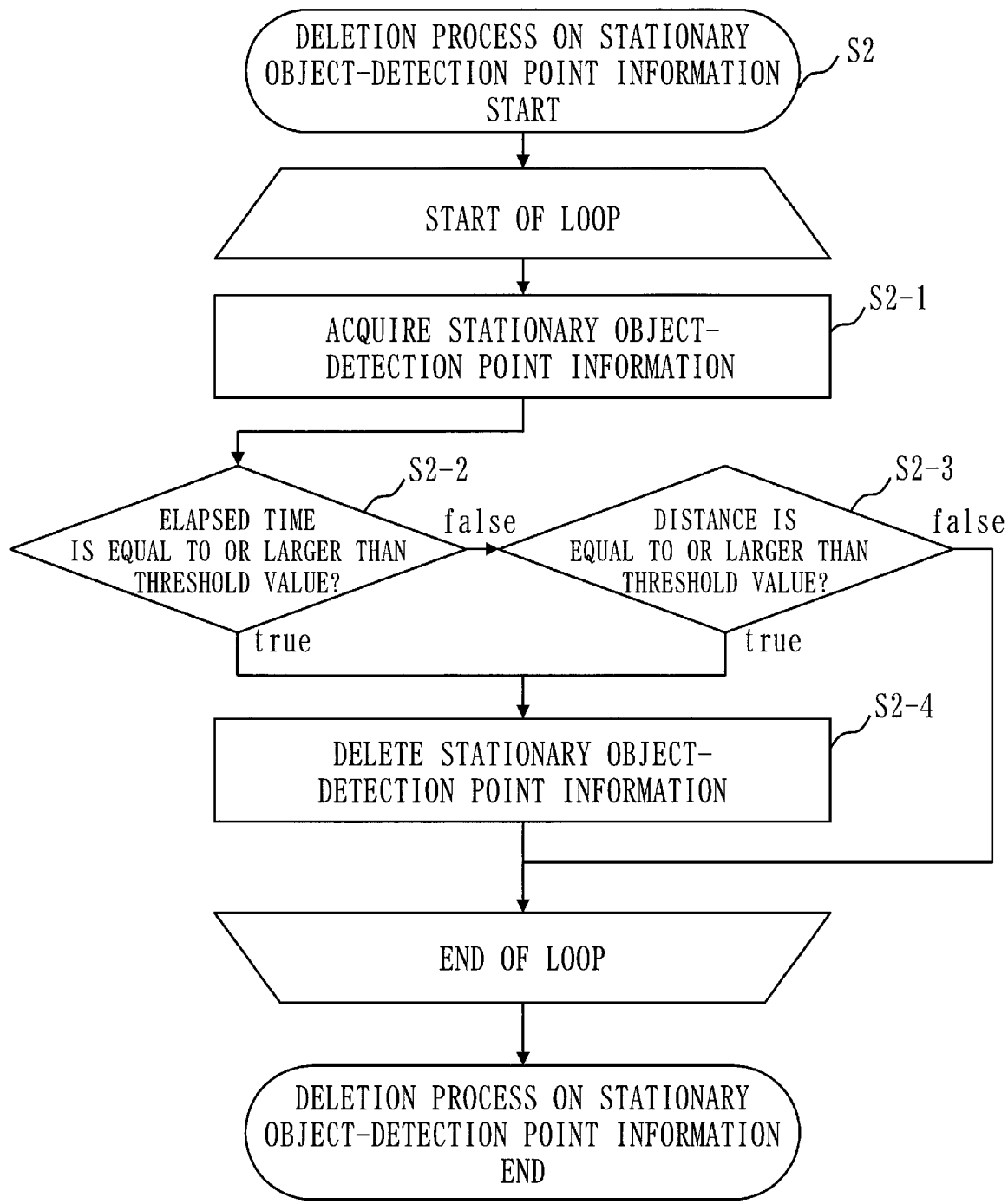
FIG. 5 is a flowchart illustrating details of a deletion process on stationary object-detection point information according to the first embodiment.

FIG. 5 indicates details of step S2. Below, FIG. 5 will be described.

The information update unit 103 performs the processes below for each stationary object-detection point information 116 stored in the accumulation unit 104.

In step S2-1, the information update unit 103 acquires i-th stationary object-detection point information $obs_i$, (i=1, 2, ... N) among N pieces of stationary object-detection point information 116.

In step S2-2, the information update unit 103 calculates an elapsed time $dt=t_{crnt}-t_{obs}$ which is from a time $t_{obs}$ at which the stationary object-detection point information $obs_i$, acquired in step S2-1 is generated by the extraction unit 101, to a time $t_{crnt}$ (referred to as a current time) at which the present process is performed. Then, the information update unit 103 determines whether or not the elapsed time dt is equal to or larger than a threshold value. If the elapsed time dt is equal to or larger than the threshold value, the process proceeds to step S2-4. If the elapsed time dt is smaller than the threshold value, the process proceeds to S2-3.

In step S2-3, the information update unit 103 calculates, by using (equation 1) below, a distance $d_i$ between a position $(x_i$, and $y_i)$ of the stationary object-detection point 350 and a position $(x_{ego}$ and $y_{ego})$ of the vehicle 200 which are in the map coordinate system.

Then, the information update unit 103 determines whether or not the calculated distance $d_i$, is equal to or larger than a threshold value.

If the distance $d_i$, is equal to or larger than the threshold value, the process proceeds to step S2-4. If the distance $d_i$ is smaller than the threshold value, and there is unprocessed stationary object-detection point information 116, the process proceeds to S2-1. If all pieces of stationary object-detection point information 116 are processed, step S2 ends.

[formula 1]

$$d_i = \sqrt{(x_i - x_{ego})^2 + (y_i - y_{ego})^2} \qquad \text{(equation 1)}$$

In step S2-4, since the stationary object-detection point information $obs_i$, meets the deletion condition, the information update unit 103 deletes the stationary object-detection point information $obs_i$, from the accumulation unit 104.

As described above, in step S2-2, step S2-3, and step S2-4, the information update unit 103 deletes the stationary object-detection point 350 whose elapsed time from a time when the stationary object-detection point 350 is detected by the outside-detection sensor 501 is equal to or larger than a threshold value and whose distance from the vehicle 200 is equal to or larger than a threshold value. For this reason, in step S6 which will be described later, the stationary object-detection point 350 whose elapsed time from a time when the stationary object-detection point 350 is detected by the outside-detection sensor 501 is equal to or larger than the threshold value and whose distance from the vehicle 200 is equal to or larger than the threshold value, is not subject to the grouping.

After step S2-4 ends, if there is unprocessed stationary object-detection point information 116, the process proceeds to S2-1. If all pieces of stationary object-detection point information 116 are processed, step S2 ends.

[Step S3: A Stationary Object Determination Process of Detection Point Information]

In step S3, the extraction unit 101 determines whether or not a detection point $det\_obs_i$ (i=1, 2, ..., N_DET_NUM) indicated in the detection point information 111 from the outside-detection sensor 501 is a detection point on the stationary object.

Figure 6:
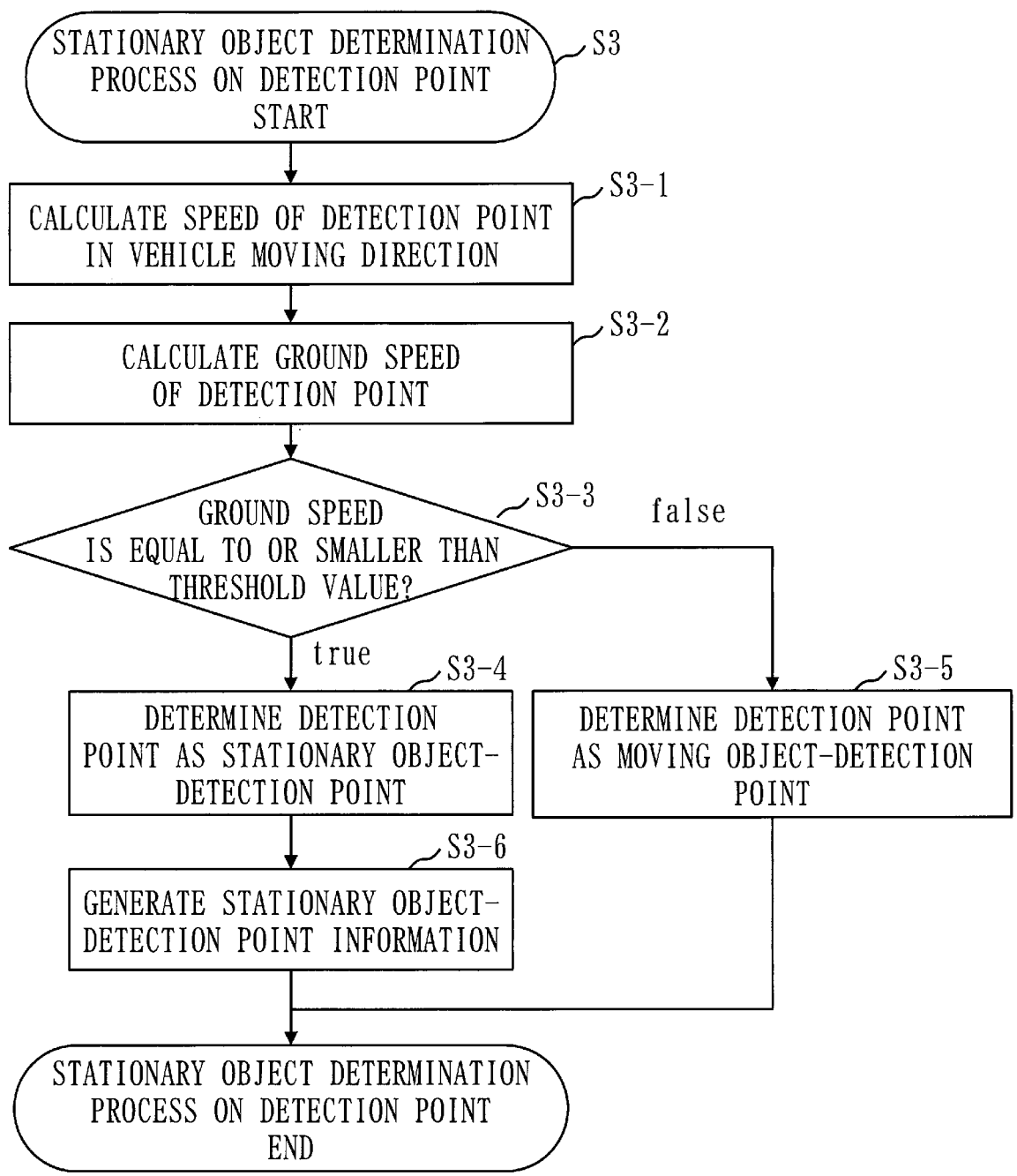
FIG. 6 is a flowchart illustrating details of a stationary object determination process on detection point information according to the first embodiment.

FIG. 6 indicates details of step S3. Below, FIG. 6 will be described.

In step S3-1, the extraction unit 101 acquires speed Vx which corresponds to a component of a travelling direction of the vehicle 200, among speeds of the detection point $det\_obs_i$. The extraction unit 101 determines the travelling direction of the vehicle 200 based on the vehicle motion information 112.

In step S3-2, the extraction unit 101 calculates ground speed $V_{ground}$ (speed relative to the ground) of the detection point $det\_obs_i$ by $V_{ground} = V_x - V_{ego}$. $V_{ego}$ is speed of the vehicle 200 which is indicated in the vehicle motion information 112.

In step S3-3, the extraction unit 101 determines whether or not an absolute value of the ground speed $V_{ground}$ is equal to or smaller than a threshold value. If the absolute value of the ground speed $V_{ground}$ is equal to or smaller than the threshold value, the process proceeds to step S3-4. On the other hand, if the absolute value of the ground speed $V_{ground}$ is larger than the threshold value, the process proceeds to S3-5.

In step S3-4, the extraction unit 101 determines that the detection point $det\_obs_i$ is the stationary object-detection point 350. The stationary object-detection point 350 is a detection point on the stationary object.

In step S3-5, the extraction unit 101 determines that the detection point $det\_obs_i$ is a moving object-detection point. The moving object-detection point is a detection point on a moving object.

In step S3-6, the extraction unit 101 generates the stationary object-detection point information 114. More specifically, the extraction unit 101 acquires from the detection point information 111, information on the stationary object-detection point 350, and generates the stationary object-detection point information 114. The stationary object-detection point information 114 indicates the position coordinates of the stationary object-detection point 350, and the time of the detection by the outside-detection sensor 501.

Then, the extraction unit 101 outputs the generated stationary object-detection point information 114 to the information update unit 103.

After step S3-6, step S3 ends.

[Step S4: A Coordinate Conversion Process of Stationary Object-Detection Point Information]

In step S4, the information update unit 103 converts the position coordinates of the stationary object-detection point 350 into the map coordinate system.

Figure 7:
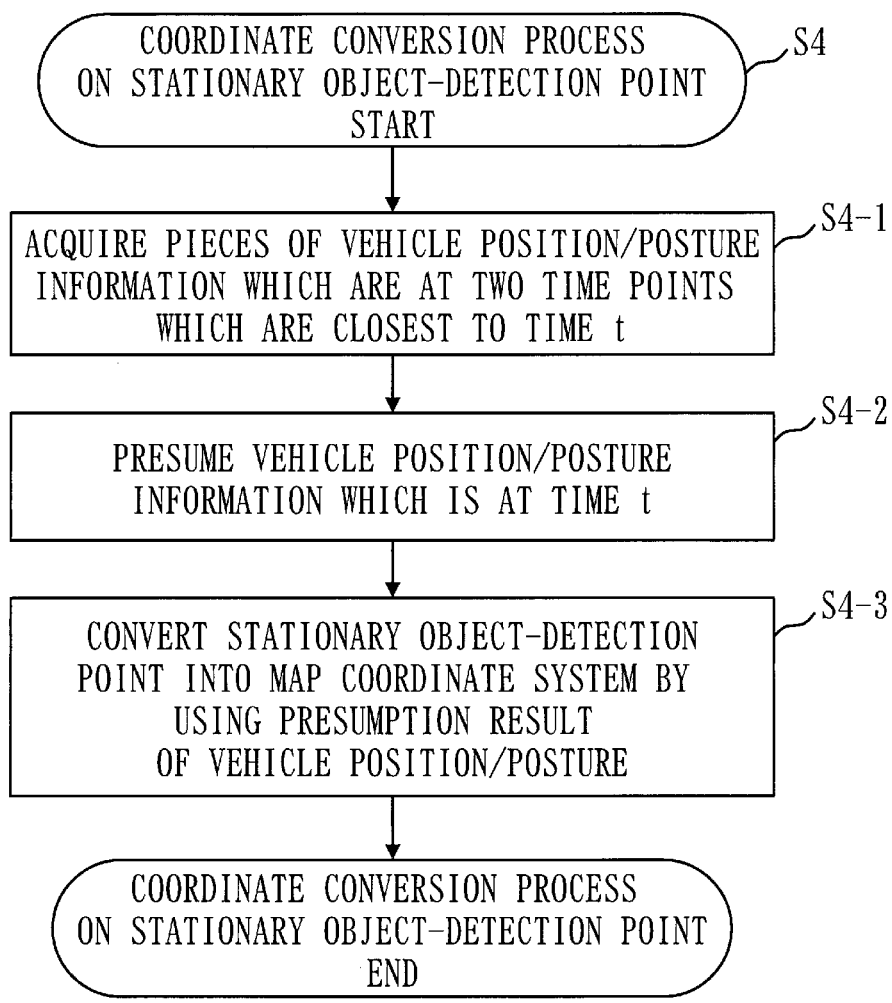
FIG. 7 is a flowchart illustrating details of a coordinate conversion process on the stationary object-detection point information according to the first embodiment.

FIG. 7 describes details of step S4. Below, FIG. 7 will be described.

As described above, the position coordinates of the stationary object-detection point indicated in the stationary object-detection point information 114 are a position (x, r, and yr) with the origin positioned at a position of the vehicle

200 at a time when the stationary object-detection point 350 is detected. The information update unit 103 converts the position (xr and yr) into a position (xm and ym) in the map coordinate system.

In step S4-1, the information update unit 103 acquires pieces of position/posture information 115 that are at two time points $t_n$ and $t_{n+1}$ which are closest to the detection time t indicated in the stationary object-detection point information 114, among the position/posture information 115 stored in the accumulation unit 104. Below, the position and the posture which are included in the position/posture information 115 at the time point $t_{n+1}$ are described as ($x_{ego\_n}$, $y_{ego\_n}$, $yaw_{ego\_n}$). Further, the position and the posture which are included in the position/posture information 115 at the time point $t_{n+1}$ are described as ($x_{ego\_n+1}$, $y_{ego\_n+1}$, $yaw_{ego\_n+1}$).

In step S4-2, the information update unit 103 presumes the position and the posture ($x_{ego\_t}$, $y_{ego\_t}$, $yaw_{ego\_t}$) of the vehicle 200 which are at the detection time t, based on the position/posture information 115 acquired in step S4-1.

Specifically, the information update unit 103 presumes the position and the posture ($x_{ego\_t}$, $y_{ego\_t}$, $yaw_{ego\_t}$) of the vehicle 200 which are at the detection time t, by using (equation 2) below.

[formula 2]

$$\begin{bmatrix} x_{ego\_t} \\ y_{ego\_t} \\ yaw_{ego\_t} \end{bmatrix} = \frac{t}{t_{n+1} - t_n} \begin{bmatrix} x_{ego\_n+1} & -x_{ego\_n} \\ y_{ego\_n+1} & -y_{ego\_n} \\ yaw_{ego\_n+1} & -yaw_{ego\_n} \end{bmatrix} \quad \text{(equation 2)}$$

In step S4-3, the information update unit 103 converts into values in the map coordinate system, the position coordinates of the stationary object-detection point 350 indicated in the stationary object-detection point information 114 by using the presumption result of the position/posture of the vehicle 200 acquired in step S4-2. Specifically, the information update unit 103 converts the values according to (equation 3) below.

Note that, ($x_{obs\_rel}$ and $y_{obs\_rel}$) are the position coordinates of the stationary object-detection point 350 indicated in the stationary object-detection point information 114, and ($x_{obs\_map}$ and $y_{obs\_map}$) are the position coordinates of the stationary object-detection point 350 in the map coordinate system.

After step S4-3, step S4 ends.

Note that, information acquired by performing the coordinate conversion of the stationary object-detection point information 114 is referred to as the stationary object-detection point information 116.

[formula 3]

$$\begin{bmatrix} x_{obs_{map}} \\ y_{obs_{map}} \\ 1 \end{bmatrix} = \begin{bmatrix} \cos(yaw_{ego\_t}) & -\sin(yaw_{ego\_t}) & x_{ego\_t} \\ \sin(yaw_{ego\_t}) & \cos(yaw_{ego\_t}) & y_{ego\_t} \\ 0 & 0 & 1 \end{bmatrix} \begin{bmatrix} x_{obs\_rel} \\ y_{obs\_rel} \\ 1 \end{bmatrix} \quad \text{(equation 3)}$$

[Step S5: A Storage Process of Stationary Object-Detection Point Information]

In step S5, the information update unit 103 stores the stationary object-detection point information 116 in the accumulation unit 104.

Figure 8:
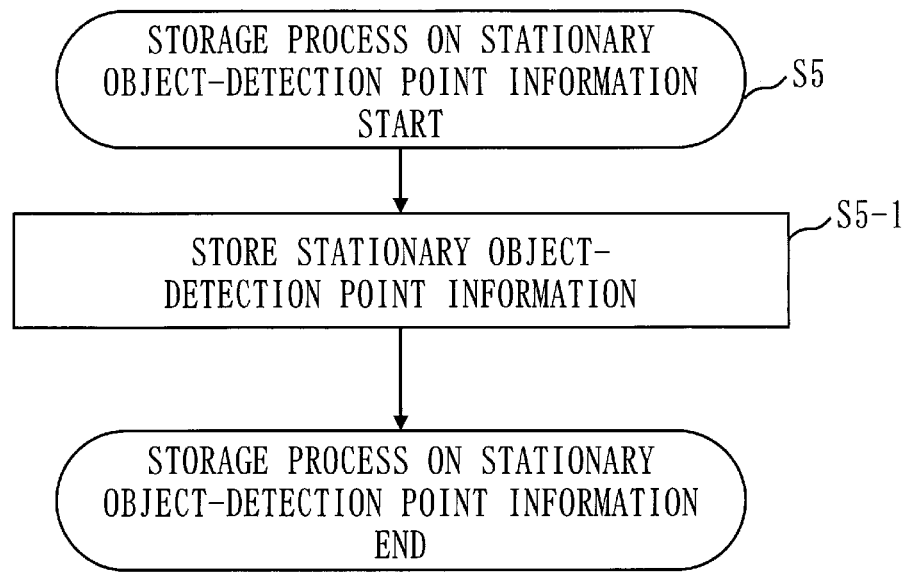
FIG. 8 is a flowchart illustrating details of a storage process on the stationary object-detection point information according to the first embodiment.

FIG. 8 describes details of step S5. Below, FIG. 8 will be described.

In step S5-1, the information update unit 103 stores the stationary object-detection point information 116 in the accumulation unit 104.

[Step S6: A Grouping Process]

In step S6, the grouping unit 105 groups the stationary object-detection points 350.

Figure 9:
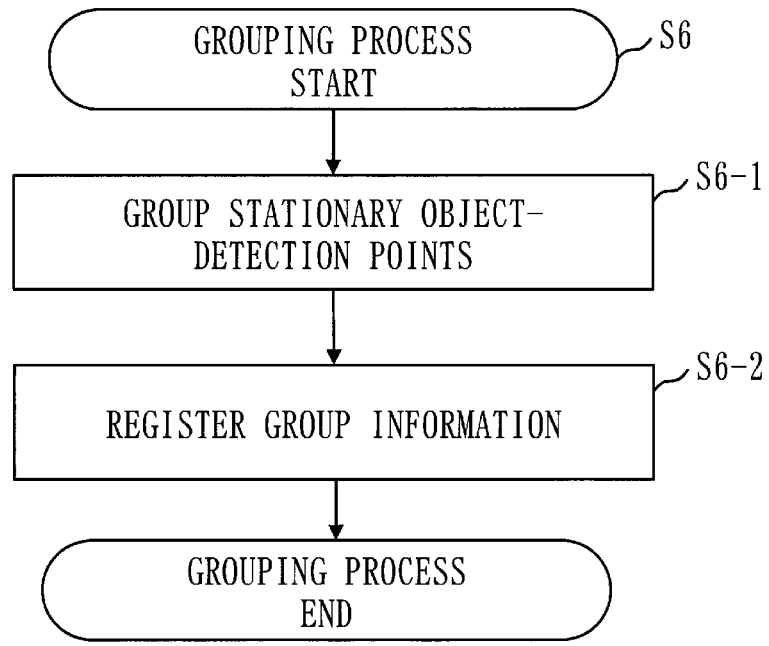
FIG. 9 is a flowchart illustrating details of a grouping process according to the first embodiment.

FIG. 9 describes details of step S6. Below, FIG. 9 will be described.

In step S6-1, the grouping unit 105 groups two or more stationary object-detection points 350 deduced as the detection points on the same stationary object among a plurality of stationary object-detection points 350. Specifically, the grouping unit 105 groups the stationary object-detection points 350 by using a density-based clustering technique. The grouping unit 105 can use, for example, DBSCAN algorithm as the density-based clustering technique.

In step S6-2, the grouping unit 105 registers in the accumulation unit 104, the group information 117 indicating details of the group 400 acquired in step S6-1. The group information 117 includes an identifier of the group 400, position coordinates of a frame of the group 400, and the position coordinates of the stationary object-detection points 350 which are included in the group 400.

Further, the grouping unit 105 may output the group information 117 to the outside. For example, the grouping unit 105 may output the group information 117 to the display mounted on the vehicle 200.

[Step S7: A Deletion Process of a Group]

In step S7, the grouping unit 105 deletes a group or some groups among the groups acquired in step S6.

Figure 10:
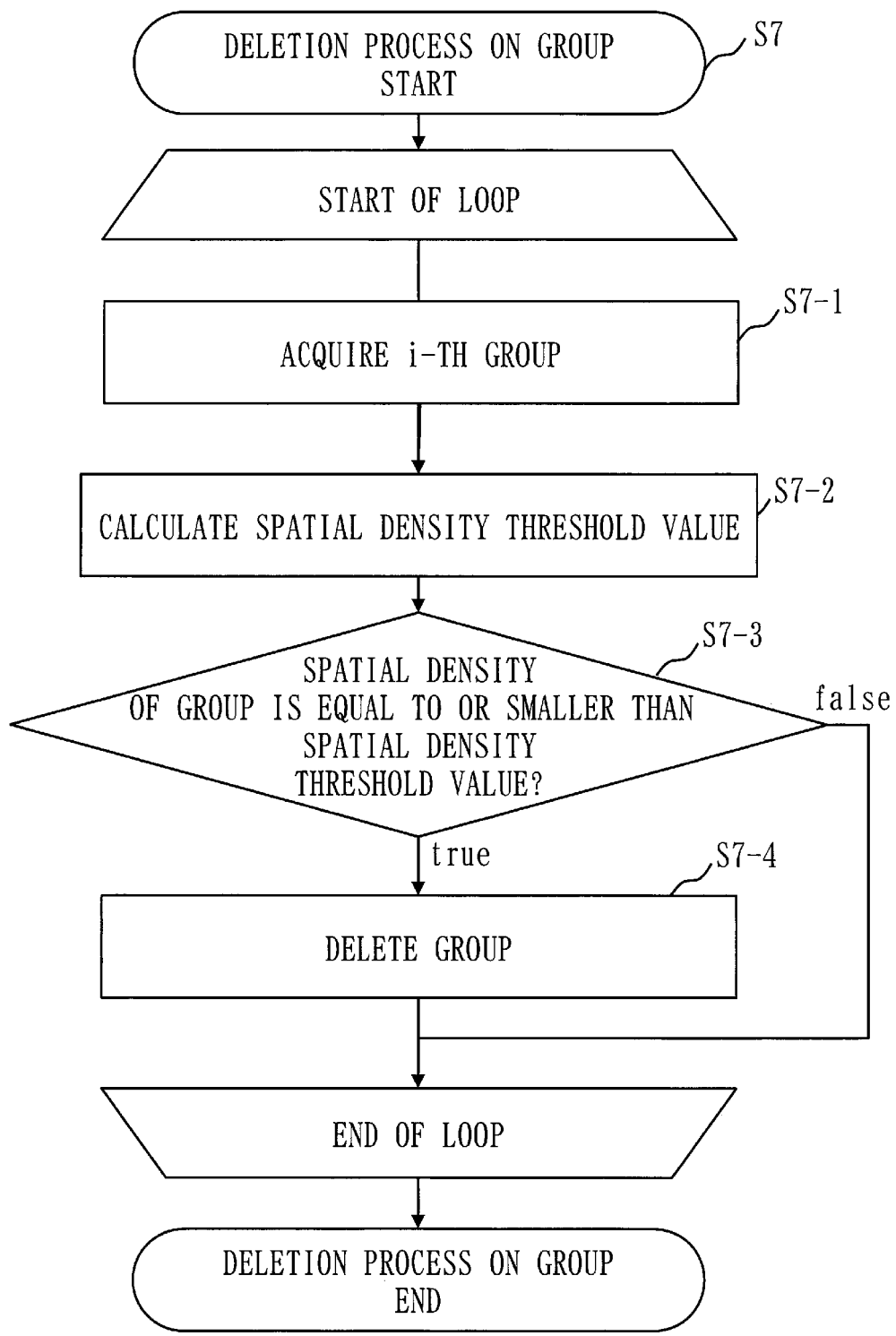
FIG. 10 is a flowchart illustrating details of a group deletion process according to the first embodiment.

FIG. 10 describes details of step S7. Below, FIG. 10 will be described.

In step S7-1, the grouping unit 105 acquires the i-th (i=1, 2, . . . N_OBS_GROUP) group 400 among N_OBS_GROUP groups 400. Below, the i-th group is referred to as a group i.

In step S7-2, the grouping unit 105 calculates a spatial density threshold value "thresh" which corresponds to a position of the group i.

Specifically, when the position of the group i is assumed as (x and y), the grouping unit 105 calculates the spatial density threshold value "thresh" by using the threshold value "thresh"=f(x, y). The position (x and y) of the group i is, for example, a position which falls on a center point of an area of the group i.

Further, the threshold value "thresh"=f(x,y) is, for example, as indicated in (equation 4) below, such a function which is proportional to a distance from the vehicle 200.

[formula 4]

$$f(x,y) = a + b\sqrt{x^2 + y^2} \quad (a, b: \text{a constant}) \quad \text{(equation 4)}$$

In step S7-3, the grouping unit 105 acquires spatial density of the group i which has been acquired at a time of the grouping process in step S6. Then, the grouping unit 105 determines whether or not the acquired spatial density is equal to or smaller than the spatial density threshold value "thresh" obtained in step S7-2. If the acquired spatial density is equal to or smaller than the spatial density threshold value "thresh", the process proceeds to S7-4.

If the acquired spatial density is larger than the spatial density threshold value "thresh", and there is an unprocessed group 400, the process proceeds to step S7-1. On the other hand, if all the groups 400 are processed, step S7 ends.

In step S7-4, the grouping unit 105 determines that the group i is noise, and deletes the group information 117 of the group i.

After step S7-4, if there is an unprocessed group 400, the process proceeds to step S7-1. On the other hand, if all the groups 400 are processed, step S7 ends.

Description of Effect of Embodiment

As described above, according to the present embodiment, when the sensor which is spatially sparse is used, it is possible to accurately recognize the stationary object around the vehicle 200, and accurately recognize the environment around the vehicle 200.

An effect according to the present embodiment will be described in details below.

Here, the description is premised on an environment around the vehicle 200 illustrated in FIG. 11.

As described above, in FIG. 11, the vehicle 200 travels on the road 600 both sides of which are walled off by the guard rails 610. In FIG. 11, the road 600 is an area in which the vehicle 200 can travel, and the travelable area. The outside of the guard rails 610 are areas in which the vehicle 200 cannot travel, and a non-travelable area.

Figure 12:
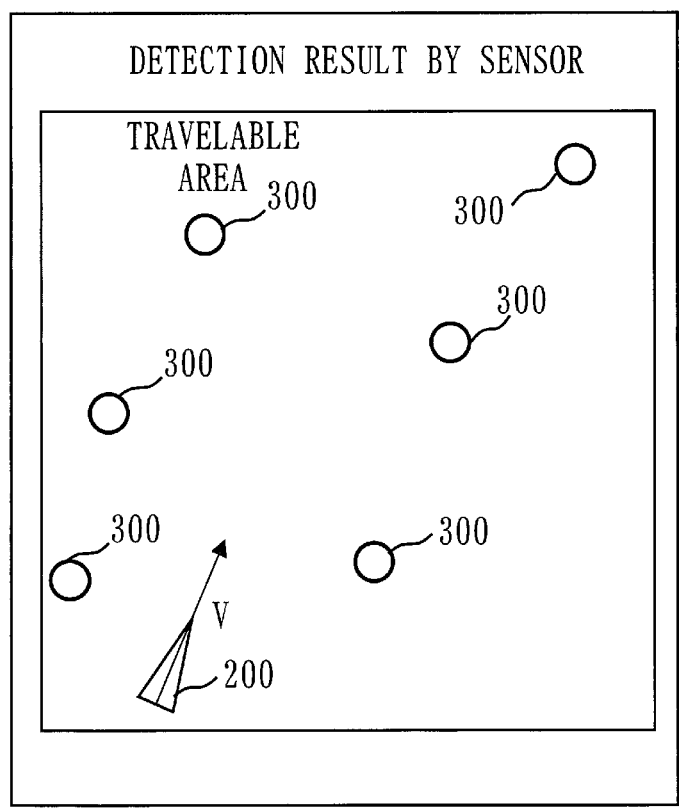
FIG. 12 is a diagram explaining the effect according to the first embodiment.

FIG. 12 illustrates a detection result by the sensor which is spatially sparse. In FIG. 12, only the detection points 300 are determined to be obstacles around the vehicle 200, and only the detection points 300 are recognized as the non-travelable area. Therefore, an area which is not actually travelable is mistakenly recognized as the travelable area. When the technique of Patent Literature 1 is used, a recognition result illustrated in FIG. 12 is acquired.

Figure 13:
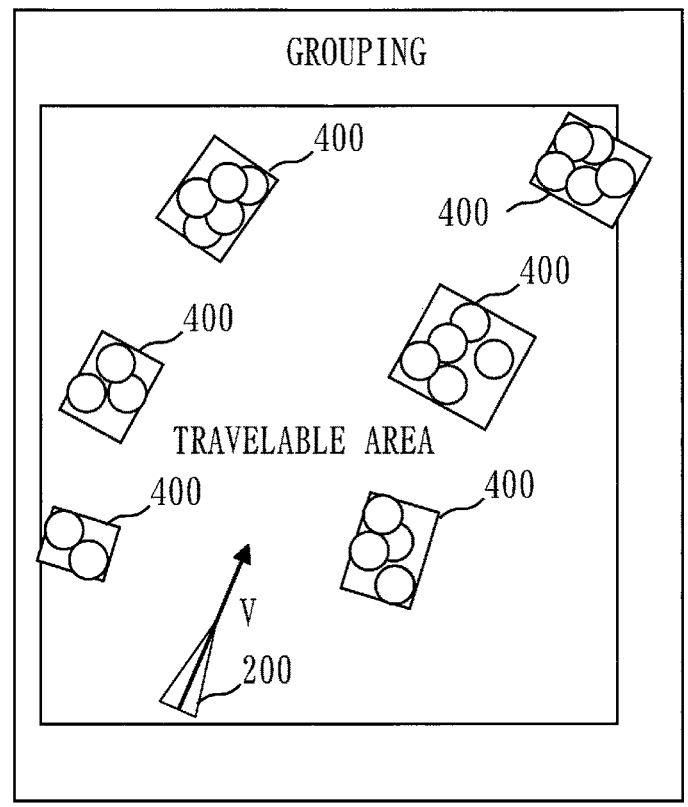
FIG. 13 is a diagram explaining the effect according to the first embodiment.

FIG. 13 illustrates a state after the grouping of the stationary object-detection points 350 has been performed by the grouping unit 105. In FIG. 13, the stationary object-detection points 350 are grouped, and a plurality of groups 400 exist. In FIG. 13, the groups 400 are recognized along shapes of the guard rails 610. Therefore, it is possible to deduce that obstacles exist one after another along both sides of the vehicle 200. In this way, according to the present embodiment, even when the sensor which is spatially sparse is used, it is possible to accurately recognize the environment around the vehicle 200.

Second Embodiment

Outline

In the present embodiment, an example in which the plurality of groups 400 acquired in the first embodiment are connected.

In the present embodiment, mainly a difference between the first embodiment and the present embodiment will be described.

Note that, matters not described below are the same as the first embodiment.

Figure 14:
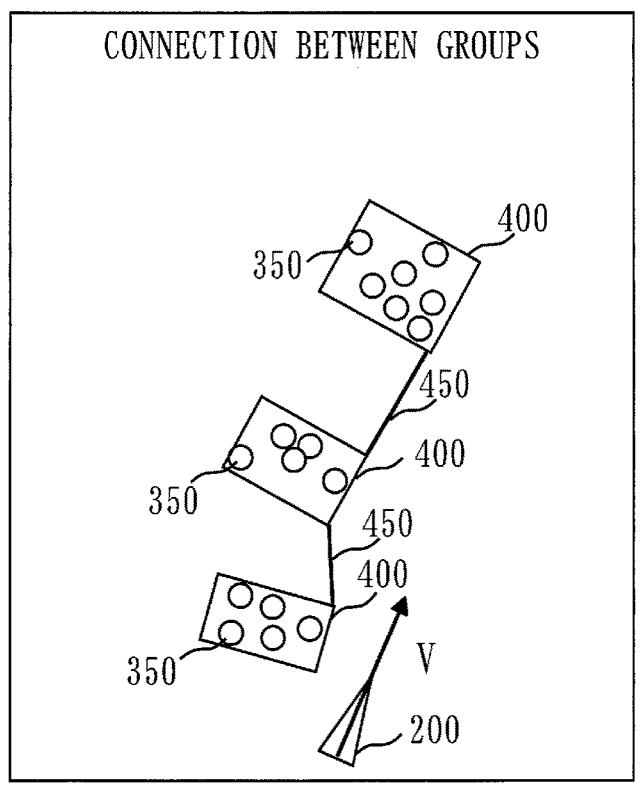
FIG. 14 is a diagram illustrating an outline of operation of an object recognition apparatus according to a second embodiment.

FIG. 14 illustrates an example of connecting the groups.

FIG. 14 illustrates a state in which three groups 400 are connected on the map data of (c) of FIG. 1.

The vehicle 200, the stationary object-detection points 350, and the groups 400 are the same as those illustrated in (c) of FIG. 1.

In the present embodiment, the grouping unit 105 connects the groups 400 via a connection line 450 when a distance between the groups 400 is equal to or smaller than a distance threshold value. For example, for the groups 400 on a right side relative to the vehicle 200, the grouping unit 105 connects the groups 400 at a left side of a frame of each group 400 via the connection line 450. On the other hand, for the groups 400 on a left side of the vehicle 200, the grouping unit 105 connects the groups 400 at a right side of a frame of each group 400 via the connection line 450.

Further, the grouping unit 105 can change the distance threshold value according to travelling speed of the vehicle 200. Specifically, the grouping unit 105 increases the distance threshold value between the groups 400 as the travelling speed of the vehicle 200 increases.

Figure 15:
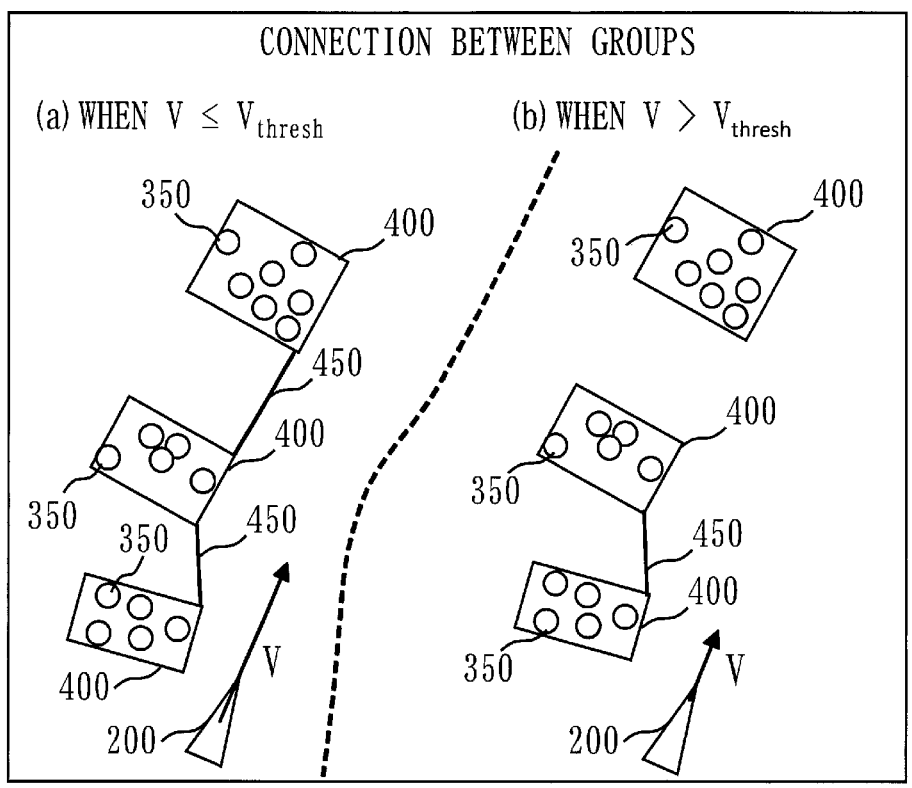
FIG. 15 is a diagram illustrating the outline of the operation of the object recognition apparatus according to the second embodiment.

(a) of FIG. 15 illustrates a state of connection between the groups 400 when the speed V of the vehicle 200 is equal to or smaller than a speed threshold value $V_{thresh}$. On the other hand, (b) of FIG. 15 illustrates a state of connection between the groups 400 when the speed V of the vehicle 200 is larger than the speed threshold value $V_{thresh}$. When the speed V is equal to or smaller than the speed threshold value $V_{thresh}$, all the groups 400 are connected as illustrated in (a) of FIG. 15. On the other hand, when the speed V of the vehicle 200 is larger than the speed threshold value $V_{thresh}$, a group 400-1 and a group 400-2 are not connected as illustrated in (b) of FIG. 15 even if the distance between the groups 400 is the same as in (a) of FIG. 15.

Description of Configuration

A functional configuration of the object recognition apparatus 100 and a configuration of sensors mounted on the vehicle 200 according to the present embodiment are as illustrated in FIG. 2.

Further, a hardware configuration of the object recognition apparatus 100 according to the present embodiment is as illustrated in FIG. 23.

Description of Operation

Figure 16:
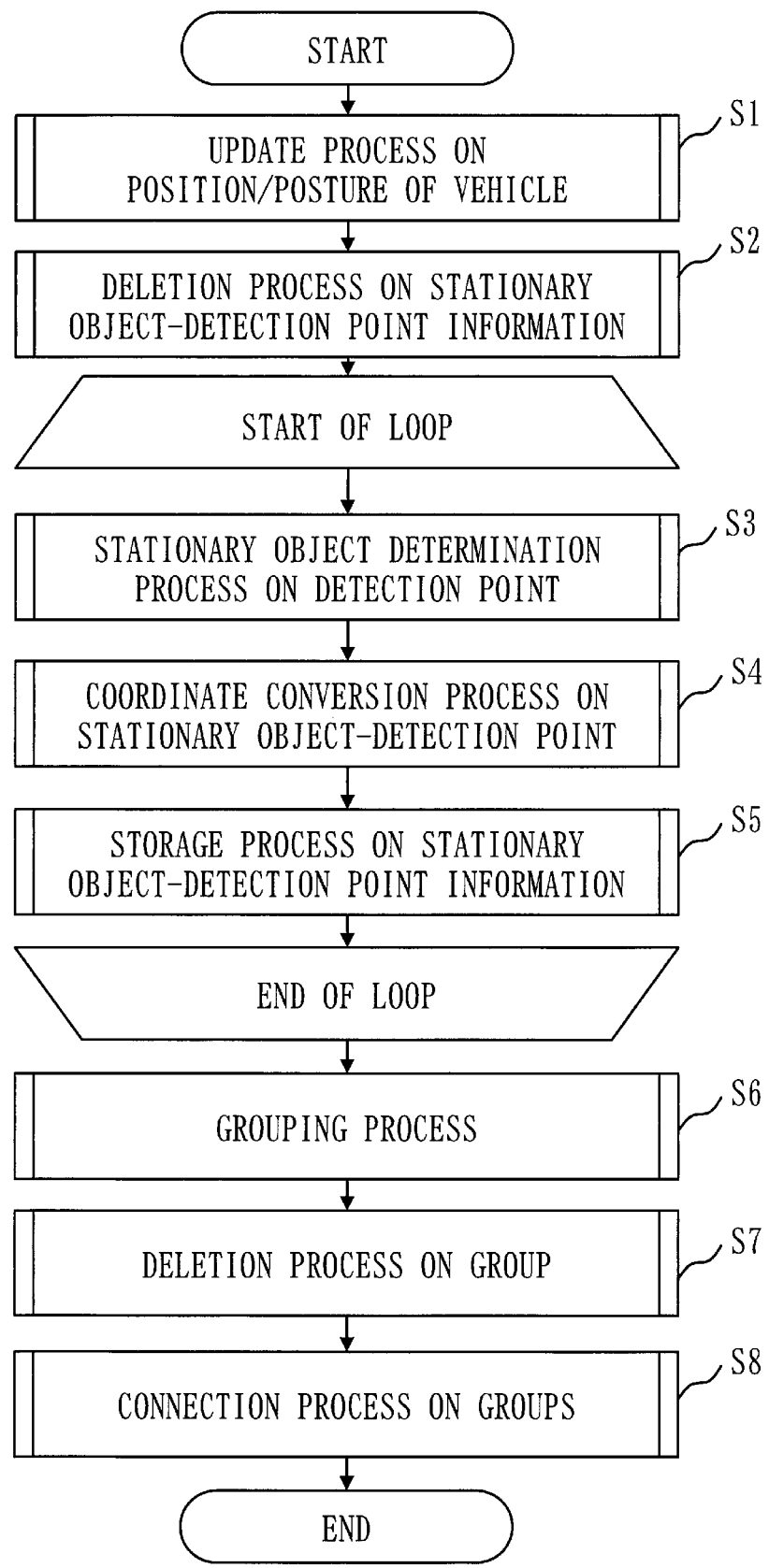
FIG. 16 is a flowchart illustrating an operation example of the object recognition apparatus according to the second embodiment.

FIG. 16 illustrates an operation example of the object recognition apparatus 100 according to the present embodiment.

In FIG. 16, steps S1 to S7 are the same as those illustrated in FIG. 3. For this reason, the descriptions of steps S1 to S7 in FIG. 16 will be omitted.

[Step S8: A Connection Process of Groups]

In step S8, the grouping unit 105 determines whether or not the vehicle 200 can travel between the groups 400, and if it is determined that the vehicle 200 cannot travel between, corresponding groups 400 are connected.

Figure 17:
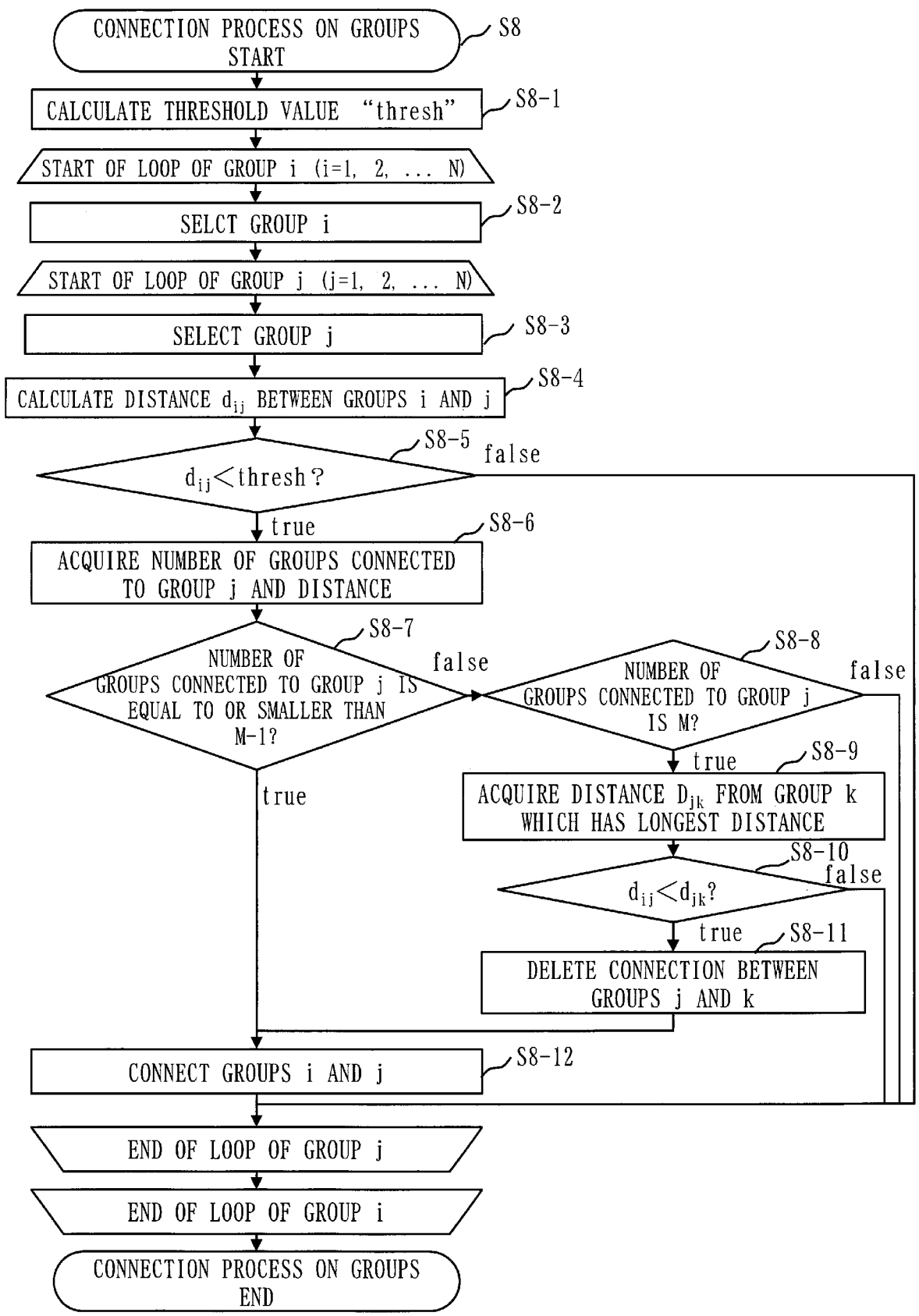
FIG. 17 is a flowchart illustrating details of a connection process on groups according to the second embodiment.

FIG. 17 describes details of FIG. 16. Below, FIG. 17 will be described.

In step S8-1, the grouping unit 105 calculates the threshold value "thresh" which is for determination as to whether the groups are connected, according to the speed V of the vehicle 200. For example, the grouping unit 105 calculates the threshold value "thresh" using the threshold value "thresh"=a*V+b (a, b: a constant). Consequently, when the speed of the vehicle 200 is large, the threshold value "thresh" is large.

In step S8-2, the grouping unit 105 selects the i-th group 400 (i=1, 2, . . . , N) among N groups 400 generated in the above-described step S6-1. Below, the i-th group 400 is referred to as a group i.

Further, in step S8-3, the grouping unit 105 selects the j-th group 400 (j=1, 2, . . . , N, and j≠i) among N groups 400. Below, the j-th group 400 is referred to as a group j.

In step S8-4, a distance $d_{ij}$ between the group i and the group j both selected is calculated, for example, by using (equation 5) below. Note that, "$x_i$" indicates x coordinate of the group i, and "$y_j$" indicates y coordinate of the group i. Similarly, "$x_j$" indicates x coordinate of the group j, and the "$y_j$" indicates y coordinate of the group j. For example, the "$x_i$" indicates x coordinate of a center point of an area of the group i, and the "$y_i$" indicates y coordinate of the center point of the area of the group i. Similarly, the "$x_j$" indicates x coordinate of a center point of an area of the group j, and the "$y_j$" indicates y coordinate of the center point of the area of the group j.

[formula 5]

$$d_{ij} = \sqrt{(x_i - x_j)^2 + (y_i - y_j)^2} \quad \text{(equation 5)}$$

In step S8-5, the grouping unit 105 compares the distance d between the group i and the group j with the threshold value "thresh".

If the distance $d_{ij}$ is larger than the threshold value "thresh", and there is a group 400 which has not been selected as the group j yet, the process returns to step S8-3. If all the groups 400 have been selected as the group j, and there is the group 400 which has not been selected as the group i yet, the process returns to step S8-2. If all the groups 400 have been selected as the group i, the process proceeds to step S8-13.

On the other hand, if the distance $d_{ij}$ is equal to or smaller than the threshold value "thresh", the process proceeds to step S8-6.

In step S8-6, the grouping unit 105 acquires the number of groups 400 which have been connected to the group j already. Further, the grouping unit 105 calculates a distance between each of the groups 400 connected to the group j and the group j.

In step S8-7, the grouping unit 105 determines whether or not the number of groups 400 connected to the group j is equal to or smaller than M−1.

Here, "M" means the maximum number of groups (M=0, 1, 2, . . . N−1) to which one group 400 can be connected.

When the number of groups 400 which are connected to the group j is equal to or smaller than M−1, the process proceeds to step S8-12.

On the other hand, if the number of groups which are connected to the group j is larger than M−1, the process proceeds to step S8-8.

In step S8-8, the grouping unit 105 determines whether or not the number of groups 400 which are connected to the group j is M. If the number of groups 400 which are connected to the group j is M, the process proceeds to step S8-9.

On the other hand, if the number of groups 400 which are connected to the group j is larger than M, and there is a group 400 which has not been selected as the group j yet, the process returns to step S8-3. If all the groups 400 have been selected as the group j, and there is a group 400 which has not been selected as the group i yet, the process returns to step S8-2. If all the groups 400 have been selected as the group i, the process proceeds to step S8-13.

In step S8-9, the grouping unit 105 acquires: a group k which has the longest distance to the group j, among M groups 400 which have been connected to the group j already; and a distance $d_{jk}$ between the group j and the group k.

In step S8-10, the grouping unit 105 compares the distance $d_{ij}$ between the group i and the group j with the distance $d_{jk}$ between the group j and the group k.

If the distance $d_{ij}$ is equal to or smaller than the distance $d_{jk}$, the process proceeds to step S8-11. On the other hand, if the distance $d_{ij}$ is larger than the distance $d_{jk}$, and there is a group 400 which has not been selected as the group j yet, the process returns to step S8-3. If all the groups 400 have been selected as the group j, and there is a group 400 which has not been selected as the group i yet, the process returns to step S8-2. If all the groups 400 have been selected as the group i, the process proceeds to step S8-13.

In step S8-11, the grouping unit 105 deletes the connection between the group j and the group k.

In step S8-12, the grouping unit 105 connects the group i and the group j.

If all the groups 400 have been selected as the group i and the group j, in step S8-13, the grouping unit 105 generates group connection information in which the results of step S8-11 and step S8-12 are reflected.

Then, the grouping unit 105 registers the generated group connection information in the accumulation unit 104. Further, the grouping unit 105 may output the generated group connection information to the outside. For example, the grouping unit 105 may output the group connection information to the display mounted on the vehicle 200.

Figure 18:
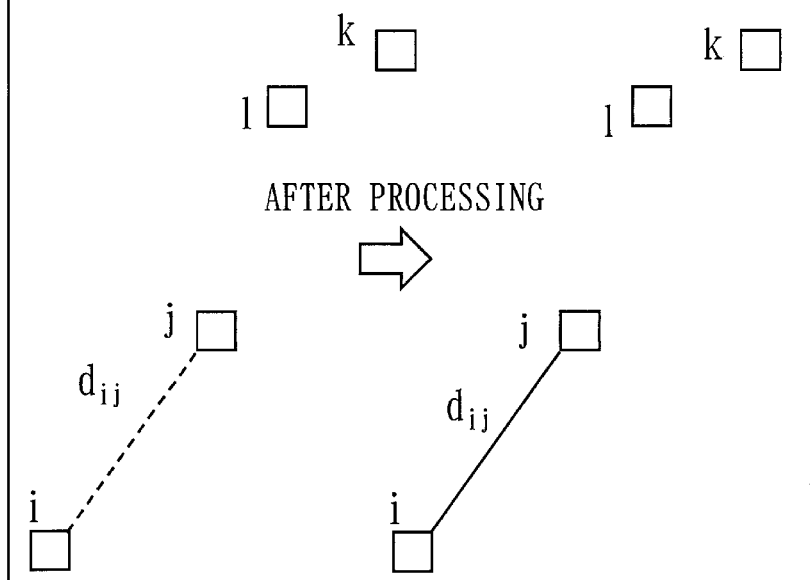
FIG. 18 is a diagram illustrating a connection example when the number of groups connected to a group j is zero, according to the second embodiment.
Figure 19:
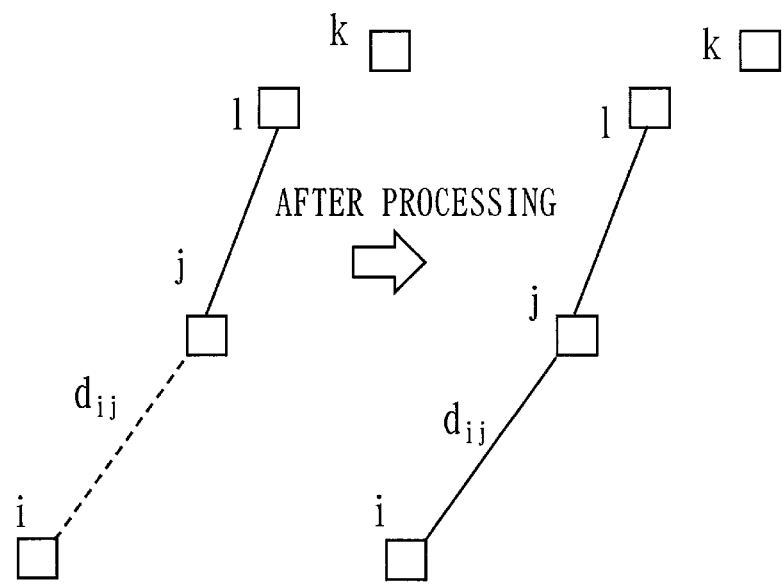
FIG. 19 is a diagram illustrating a connection example when the number of groups connected to the group j is M−1, according to the second embodiment.

FIGS. 18 and 19 illustrate operation examples of the grouping unit 105 where the determination of step S8-7 is "true".

In FIGS. 18 and 19, "$d_{ij}$<thresh" is defined as a condition. Since the determination of step S8-5 is "true", this condition is met. For this reason, the grouping unit 105 connects the group i and the group j in step S8-12.

Figure 20:
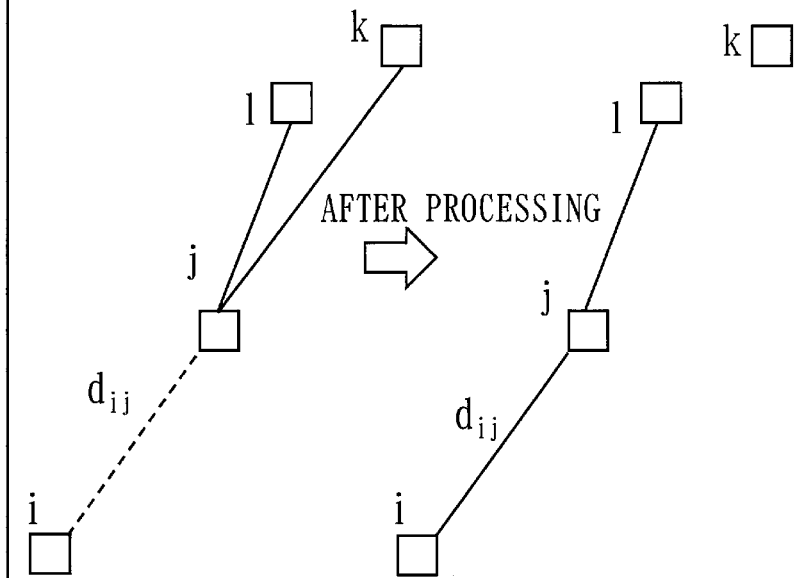
FIG. 20 is a diagram illustrating a connection example when the number of groups connected to the group j is M1, according to the second embodiment.

FIG. 20 illustrates an operation example of the grouping unit 105 where the determination of step S8-7 is "false" and the process of step S8-8 is "true".

In FIG. 20, "$d_{ij}$<thresh" and "$d_{ij}$<$d_{jk}$" are defined as conditions. Since the determination of step S8-5 is "true", "$d_{ij}$<thresh" is met. If the condition of "$d_{ij}$<$d_{jk}$" is met in the determination of step S8-10, the grouping unit 105 deletes the connection between the group j and the group k in step S8-11, and connects the group i and the group j in step S8-12.

Further, the grouping unit 105 may distinguish between the travelable area and the non-travelable area based on a result of the connection between the groups 400.

Figure 21:
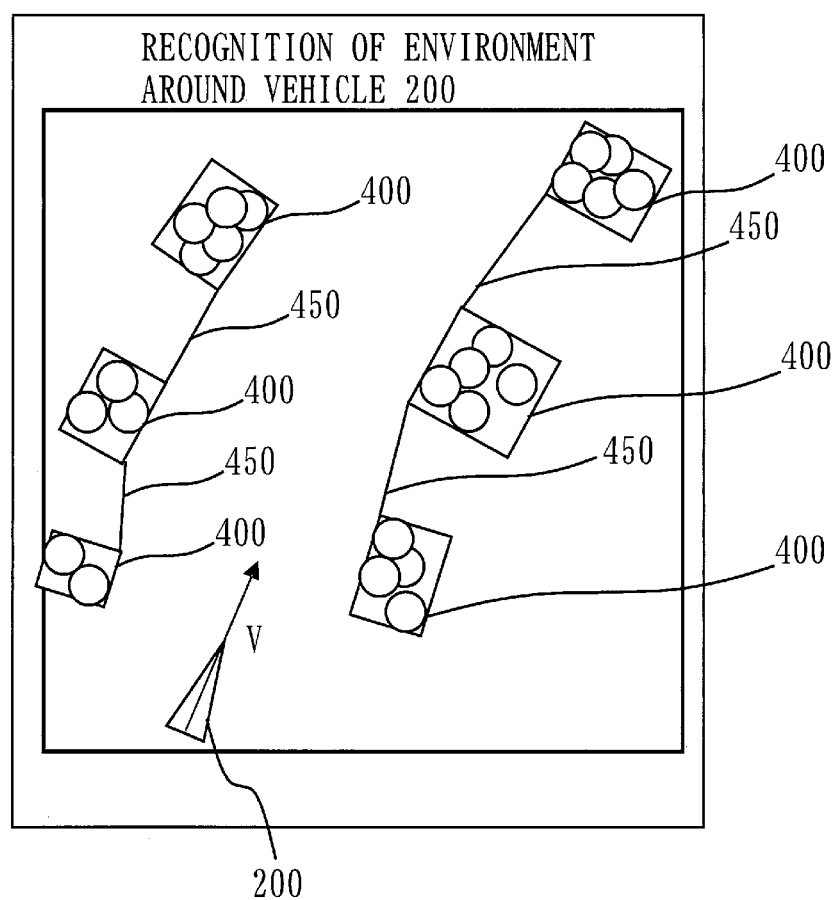
FIG. 21 is a diagram explaining an effect according to the second embodiment.
Figure 22:
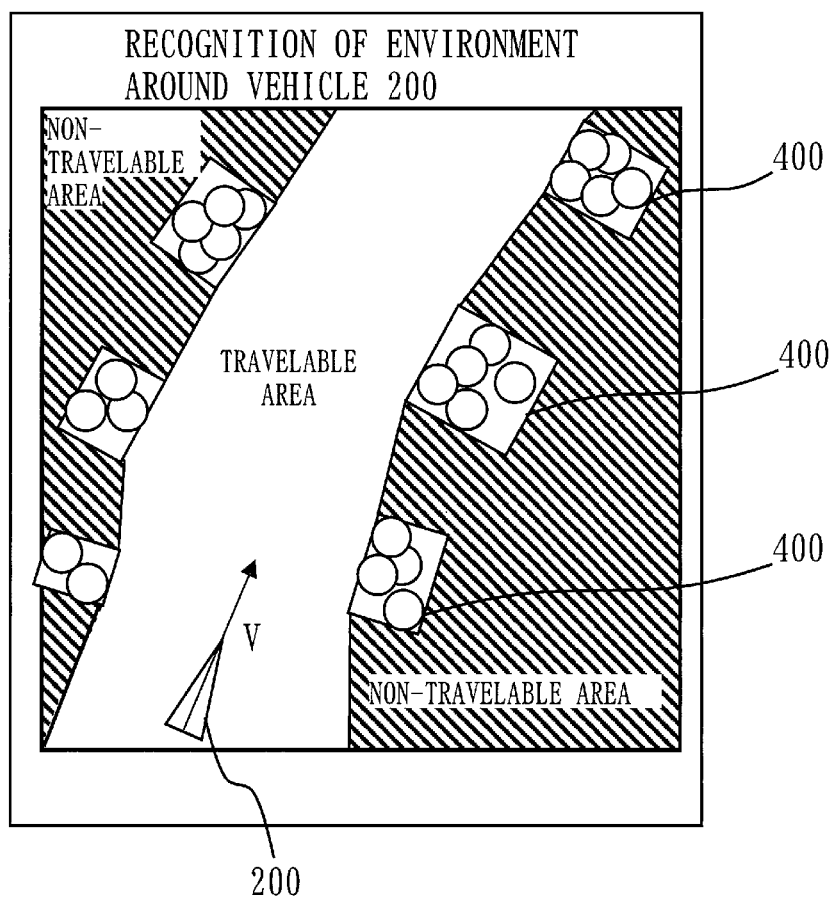
FIG. 22 is a diagram explaining the effect according to the second embodiment.

For example, if the groups 400 are connected as illustrated in FIG. 21, the grouping unit 105 can distinguish between the travelable area and the non-travelable area, as illustrated in FIG. 22, based on a state of the connection of the groups 400 and the connection lines 450. That is, the grouping unit 105 determines that an area inside of the groups 400 and the connection lines 450 is the travelable area. On the other hand, the grouping unit 105 determines that an area outside of the groups 400 and the connection lines 450 is the non-travelable area.

Description of Effect of Embodiment

As described above, in the present embodiment, two or more groups distance between which is equal to or smaller than the threshold value are connected. Then, in the present embodiment, it is possible to distinguish between the travelable area and the non-travelable area based on the state of the connection between the groups. Therefore, according to the present embodiment, when the vehicle 200 is an autonomous driving vehicle, it is possible to perform autonomous driving smoothly. That is, according to the present embodiment, it is possible to avoid a situation where the autonomous driving vehicle enters the non-travelable area, and to enable the autonomous driving vehicle to travel in the travelable area.

Although the embodiments of the present invention have been described above, these two embodiments may be combined and implemented.

Alternatively, one of these two embodiments may be partially implemented.

Alternatively, these two embodiments may be partially combined and implemented.

Note that, the present invention is not limited to these embodiments, and various modifications can be made as necessary.

Description of Hardware Configuration

Finally, supplementary descriptions of the hardware configuration of the object recognition apparatus 100 will be given.

The processor 901 illustrated in FIG. 23 is an IC (Integrated Circuit) that performs processing.

The processor 901 is a CPU (Central Processing Unit), a DSP (Digital Signal Processor), or the like.

The main storage device 902 illustrated in FIG. 23 is an RAM (Random Access Memory).

The auxiliary storage device 903 illustrated in FIG. 23 is a ROM (Read Only Memory), a flash memory, an HDD (Hard Disk Drive), or the like.

The communication device 904 illustrated in FIG. 23 is an electronic circuit that executes a communication process of data.

The communication device 904 is, for example, a communication chip or an NIC (Network Interface Card).

Further, the auxiliary storage device 903 also stores an OS (Operating System).

Then, at least a part of the OS is executed by the processor 901.

The processor 901 executes programs that realize functions of the extraction unit 101, the vehicle position/posture presumption unit 102, the information update unit 103, and the grouping unit 105 while executing at least the part of the OS.

By the processor 901 executing the OS, task management, memory management, file management, communication control, and the like are performed.

Further, at least one of information, data, a signal value, and a variable value that indicate a result of a process of the extraction unit 101, the vehicle position/posture presumption unit 102, the information update unit 103, and the grouping unit 105 is stored in at least one of the main storage device 902, the auxiliary storage device 903, and a register and a cash memory in the processor 901.

Further, the programs that realize the functions of the extraction unit 101, the vehicle position/posture presumption unit 102, the information update unit 103, and the grouping unit 105 may be stored in a portable recording medium such as a magnetic disk, a flexible disk, an optical disc, a compact disc, a Blu-ray (registered trademark) disc, or a DVD. Further, the portable recording medium storing the programs that realize the functions of the extraction unit 101, the vehicle position/posture presumption unit 102, the information update unit 103, and the grouping unit 105 may be distributed.

Further, "unit" of the extraction unit 101, the vehicle position/posture presumption unit 102, the information update unit 103, and the grouping unit 105 may be read as "circuit", "step", "procedure", or "process".

Further, the object recognition apparatus 100 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

In this case, each of the extraction unit 101, the vehicle position/posture presumption unit 102, the information update unit 103, and the grouping unit 105 is realized as a part of the processing circuit.

Note that, in the present specification, a superordinate concept of the processor and the processing circuit is referred to as "processing circuitry".

That is, each of the processor and the processing circuit is a specific example of the "processing circuitry".

REFERENCE SIGNS LIST

100: object recognition apparatus, 101: extraction unit, 102: vehicle position/posture presumption unit, 103: information update unit, 104: accumulation unit, 105: grouping unit, 111: detection point information, 112: vehicle motion information, 113: vehicle position/posture information, 114: stationary object-detection point information, 115: position/posture information, 116: stationary object-detection point information, 117: group information, 200: vehicle, 300: detection point, 350: stationary object-detection point, 400: group, 450: connection line, 501: outside-detection sensor, 502: vehicle motion detection sensor, 503: vehicle position/posture sensor, 600: road, 610: guard rail, 901: processor, 902: main storage device, 903: auxiliary storage device, 904: communication device.

The invention claimed is:

1. An object recognition apparatus comprising:
processing circuitry
to extract as a stationary object-detection point, a detection point on a stationary object among a plurality of detection points around a vehicle, the plurality of detection points being detected by a sensor at a plurality of detection timings; and
to group two or more stationary object-detection points deduced as detection points on a same stationary object, among a plurality of stationary object-detection points extracted at the plurality of detection timings,
wherein a detection time interval between the two or more stationary object-detection points is less than or equal to a predetermined time, and a distance of each of the two or more stationary object-detection points from the vehicle is less than or equal to a predetermined distance.

2. The object recognition apparatus according to claim 1, wherein the processing circuitry extracts the stationary object-detection point based on ground speed of each detection point.

3. The object recognition apparatus according to claim 1, wherein the processing circuitry
calculates for each group, spatial density for two or more stationary object-detection points included in the group, and
discards a group whose spatial density calculated is equal to or smaller than a spatial density threshold value.

4. The object recognition apparatus according to claim 3, wherein the processing circuitry changes the spatial density threshold value according to distance between a group and the vehicle.

5. An object recognition apparatus comprising:
processing circuitry
to extract as a stationary object-detection point, a detection point on a stationary object among a plurality of detection points around a vehicle, the plurality of detection points being detected by a sensor at a plurality of detection timings; and to group two or more stationary object-detection points deduced as detection points on a same stationary object, among a plurality of stationary object-detection points extracted at the plurality of detection timings, wherein when a plurality of groups are acquired, the processing circuitry connects two or more groups among the plurality of groups.

6. The object recognition apparatus according to claim 5, wherein the processing circuitry connects two or more groups distance between each of which is equal to or smaller than a threshold value.

7. The object recognition apparatus according to claim 6, wherein the processing circuitry changes the threshold value according to speed of the vehicle.

8. The object recognition apparatus according to claim 6, wherein the processing circuitry distinguishes between a travelable area in which the vehicle can travel and a non-travelable area in which the vehicle cannot travel, based on a state of connection of two or more groups.

9. The object recognition apparatus according to claim 1, wherein the processing circuitry presumes at least one of a position and posture of the vehicle, performs coordinate conversion of the plurality of stationary object-detection points by using a presumption result, and groups two or more stationary object-detection points deduced as the detection points on the same stationary object, among the plurality of stationary object-detection points after the coordinate conversion.

10. The object recognition apparatus according to claim 1, wherein the processing circuitry deletes a stationary object-detection point which meets a deletion condition, among the plurality of stationary object-detection points.

11. An object recognition method comprising:

continuously measuring a travel speed of a vehicle;

extracting as a stationary object-detection point, a detection point on a stationary object among a plurality of detection points around a vehicle, the plurality of detection points being detected by a sensor at a plurality of detection timings; and grouping, based on a distance threshold value between groups, two or more stationary object-detection points deduced as detection points on a same stationary object, among a plurality of stationary object-detection points extracted at the plurality of detection timings, wherein the grouping of the two or more stationary object-detection points comprises setting the distance threshold value by increasing the distance threshold value as the travel speed of the vehicle increases.

12. A non-transitory computer readable medium storing an object recognition program which causes a computer to execute:

an extraction process of extracting as a stationary object-detection point, a detection point on a stationary object among a plurality of detection points around a vehicle, the plurality of detection points being detected by a sensor at a plurality of detection timings; and a grouping process of grouping two or more stationary object-detection points deduced as detection points on a same stationary object, among a plurality of stationary object-detection points extracted by the extraction process at the plurality of detection timings, wherein a detection time interval between the two or more stationary object-detection points is less than or equal to a predetermined time, and a distance of each of the two or more stationary object-detection points from the vehicle is less than or equal to a predetermined distance.

* * * * *